US012272917B2

(12) United States Patent
Winey et al.

(10) Patent No.: US 12,272,917 B2
(45) Date of Patent: Apr. 8, 2025

(54) I/O CONNECTOR CONFIGURED FOR CABLED CONNECTION TO THE MIDBOARD

(71) Applicant: FCI USA LLC, Etters, PA (US)

(72) Inventors: Jordan Winey, Middletown, PA (US); Arkady Y. Zerebilov, Lancaster, PA (US); Michael Scholeno, York, PA (US); Jeremy Shober, Lititz, PA (US)

(73) Assignee: FCI USA LLC, Etters, PA (US)

( * ) Notice: Subject to any disclaimer, the term of this patent is extended or adjusted under 35 U.S.C. 154(b) by 0 days.

(21) Appl. No.: 18/346,172

(22) Filed: Jun. 30, 2023

(65) Prior Publication Data

US 2023/0352895 A1 Nov. 2, 2023

Related U.S. Application Data

(60) Continuation of application No. 17/407,129, filed on Aug. 19, 2021, now Pat. No. 11,715,922, which is a (Continued)

(51) Int. Cl.
*H01R 43/20* (2006.01)
*H01R 12/75* (2011.01)
(Continued)

(52) U.S. Cl.
CPC ........... *H01R 43/205* (2013.01); *H01R 12/75* (2013.01); *H01R 13/506* (2013.01); *H01R 13/6587* (2013.01); *H01R 43/26* (2013.01)

(58) Field of Classification Search
None
See application file for complete search history.

(56) References Cited

U.S. PATENT DOCUMENTS 6,183,289 B1 2/2001 Lake et al.
6,846,115 B1 1/2005 Shang et al.
(Continued)

FOREIGN PATENT DOCUMENTS

CN 1976137 A 6/2007
CN 201114063 Y 9/2008
(Continued)

OTHER PUBLICATIONS

Chinese Office Action dated Jun. 9, 2022 in connection with Chinese Application No. 202080019763.4.
(Continued)

*Primary Examiner* — Ross N Gushi
(74) *Attorney, Agent, or Firm* — Wolf, Greenfield & Sacks, P.C.

(57) ABSTRACT

An I/O connector assembly configured for making a cabled connection to an interior portion of a printed circuit board for at least some signals passing through the I/O connector. The I/O connector assembly may be assembled by mounting a cage to a printed circuit board. A receptacle connector, including cables extending from a rear of the connector, may be inserted through an opening in the top or rear of the cage. The receptacle connector may be positioned in the cage by at least one retention member on the cage. A plug, mating to the receptacle connector, also may be positioned by a retention member on the cage. Positioning both the plug and receptacle relative to the cage reduces the tolerance stackup of the assembly and enables the connectors to be designed with shorter wipe length, which enables higher frequency operation.

18 Claims, 17 Drawing Sheets

Related U.S. Application Data division of application No. 16/751,013, filed on Jan. 23, 2020, now Pat. No. 11,101,611.

(60) Provisional application No. 62/860,753, filed on Jun. 12, 2019, provisional application No. 62/796,837, filed on Jan. 25, 2019.

(51) Int. Cl.

| | |
|---|---|
| ***H01R 13/506*** | (2006.01) |
| ***H01R 13/6587*** | (2011.01) |
| ***H01R 43/26*** | (2006.01) |

(56) References Cited

U.S. PATENT DOCUMENTS

| | | | |
|---|---|---|---|
| 7,422,483 | B2 | 9/2008 | Avery et al. |
| 7,431,608 | B2 | 10/2008 | Sakaguchi et al. |
| 7,445,471 | B1 | 11/2008 | Scherer et al. |
| 7,448,897 | B2 | 11/2008 | Dawiedczyk et al. |
| 7,462,942 | B2 | 12/2008 | Tan et al. |
| 7,485,012 | B2 | 2/2009 | Daugherty et al. |
| 7,494,383 | B2 | 2/2009 | Cohen et al. |
| 7,497,693 | B1 | 3/2009 | Wu |
| 7,534,142 | B2 | 5/2009 | Avery et al. |
| 7,540,747 | B2 | 6/2009 | Ice et al. |
| 7,540,781 | B2 | 6/2009 | Kenny et al. |
| 7,549,897 | B2 | 6/2009 | Fedder et al. |
| 7,553,190 | B2 | 6/2009 | Laurx et al. |
| 7,575,471 | B2 | 8/2009 | Long |
| 7,581,990 | B2 | 9/2009 | Kirk et al. |
| 7,585,188 | B2 | 9/2009 | Regnier |
| 7,588,464 | B2 | 9/2009 | Kim |
| 7,613,011 | B2 | 11/2009 | Grundy et al. |
| 7,621,779 | B2 | 11/2009 | Laurx et al. |
| 7,652,381 | B2 | 1/2010 | Grundy et al. |
| 7,654,831 | B1 | 2/2010 | Wu |
| 7,658,654 | B2 | 2/2010 | Ohyama et al. |
| 7,686,659 | B2 | 3/2010 | Peng |
| 7,690,930 | B2 | 4/2010 | Chen et al. |
| 7,713,077 | B1 | 5/2010 | McGowan et al. |
| 7,719,843 | B2 | 5/2010 | Dunham |
| 7,722,401 | B2 | 5/2010 | Kirk et al. |
| 7,722,404 | B2 | 5/2010 | Neumetzler |
| 7,731,537 | B2 | 6/2010 | Amleshi et al. |
| 7,744,414 | B2 | 6/2010 | Scherer et al. |
| 7,753,731 | B2 | 7/2010 | Cohen et al. |
| 7,764,504 | B2 | 7/2010 | Phillips et al. |
| 7,771,233 | B2 | 8/2010 | Gailus |
| 7,775,802 | B2 | 8/2010 | Defibaugh et al. |
| 7,781,294 | B2 | 8/2010 | Mauder et al. |
| 7,789,676 | B2 | 9/2010 | Morgan et al. |
| 7,794,240 | B2 | 9/2010 | Cohen et al. |
| 7,794,278 | B2 | 9/2010 | Cohen et al. |
| 7,806,698 | B2 | 10/2010 | Regnier |
| 7,811,129 | B2 | 10/2010 | Glover et al. |
| 7,819,675 | B2 | 10/2010 | Ko et al. |
| 7,824,197 | B1 | 11/2010 | Westman et al. |
| 7,828,560 | B2 | 11/2010 | Wu et al. |
| 7,857,630 | B2 | 12/2010 | Hermant et al. |
| 7,862,344 | B2 | 1/2011 | Morgan et al. |
| 7,871,294 | B2 | 1/2011 | Long |
| 7,871,296 | B2 | 1/2011 | Fowler et al. |
| 7,874,873 | B2 | 1/2011 | Do et al. |
| 7,887,371 | B2 | 2/2011 | Kenny et al. |
| 7,906,730 | B2 | 3/2011 | Atkinson et al. |
| 7,914,302 | B1 | 3/2011 | Zhu |
| 7,914,304 | B2 | 3/2011 | Cartier et al. |
| 7,976,318 | B2 | 7/2011 | Fedder et al. |
| 7,985,097 | B2 | 7/2011 | Gulla |
| 7,993,147 | B2 | 8/2011 | Cole et al. |
| 8,002,581 | B1 | 8/2011 | Whiteman, Jr. et al. |
| 8,016,616 | B2 | 9/2011 | Glover et al. |
| 8,018,733 | B2 | 9/2011 | Jia |
| 8,036,500 | B2 | 10/2011 | McColloch |
| 8,057,266 | B1 | 11/2011 | Roitberg |
| 8,057,267 | B2 | 11/2011 | Johnescu |
| 8,083,553 | B2 | 12/2011 | Manter et al. |
| 8,092,235 | B2 | 1/2012 | Frantum, Jr. et al. |
| 8,092,254 | B2 | 1/2012 | Miyazaki et al. |
| 8,100,699 | B1 | 1/2012 | Costello |
| 8,157,573 | B2 | 4/2012 | Tanaka |
| 8,162,675 | B2 | 4/2012 | Regnier et al. |
| RE43,427 | E | 5/2012 | Dawiedczyk et al. |
| 8,167,651 | B2 | 5/2012 | Glover et al. |
| 8,182,289 | B2 | 5/2012 | Stokoe et al. |
| 8,192,222 | B2 | 6/2012 | Kameyama |
| 8,197,285 | B2 | 6/2012 | Farmer |
| 8,210,877 | B2 | 7/2012 | Droesbeke |
| 8,215,968 | B2 | 7/2012 | Cartier et al. |
| 8,226,441 | B2 | 7/2012 | Regnier et al. |
| 8,251,745 | B2 | 8/2012 | Johnescu et al. |
| 8,272,877 | B2 | 9/2012 | Stokoe et al. |
| 8,282,402 | B2 | 10/2012 | Ngo |
| 8,308,491 | B2 | 11/2012 | Nichols et al. |
| 8,308,512 | B2 | 11/2012 | Ritter et al. |
| 8,337,243 | B2 | 12/2012 | Elkhatib et al. |
| 8,338,713 | B2 | 12/2012 | Fjelstad et al. |
| 8,358,504 | B2 | 1/2013 | McColloch et al. |
| 8,371,875 | B2 | 2/2013 | Gailus |
| 8,371,876 | B2 | 2/2013 | Davis |
| 8,382,524 | B2 | 2/2013 | Khilchenko et al. |
| 8,398,433 | B1 | 3/2013 | Yang |
| 8,419,472 | B1 | 4/2013 | Swanger et al. |
| 8,439,704 | B2 | 5/2013 | Reed |
| 8,449,312 | B2 | 5/2013 | Lang et al. |
| 8,449,330 | B1 | 5/2013 | Schroll et al. |
| 8,465,302 | B2 | 6/2013 | Regnier et al. |
| 8,465,320 | B2 | 6/2013 | Long |
| 8,469,738 | B2 | 6/2013 | Long |
| 8,469,745 | B2 | 6/2013 | Davis et al. |
| 8,475,210 | B2 | 7/2013 | Wang |
| 8,535,065 | B2 | 9/2013 | Costello et al. |
| 8,540,525 | B2 | 9/2013 | Regnier et al. |
| 8,550,861 | B2 | 10/2013 | Cohen et al. |
| 8,553,102 | B2 | 10/2013 | Yamada |
| 8,556,657 | B1 | 10/2013 | Nichols |
| 8,588,561 | B2 | 11/2013 | Zbinden et al. |
| 8,588,562 | B2 | 11/2013 | Zbinden et al. |
| 8,597,045 | B2 | 12/2013 | Zhu |
| 8,597,055 | B2 | 12/2013 | Regnier et al. |
| 8,632,365 | B2 | 1/2014 | Ngo |
| 8,651,880 | B2 | 2/2014 | Wu et al. |
| 8,657,627 | B2 | 2/2014 | McNamara et al. |
| 8,662,923 | B2 | 3/2014 | Wu |
| 8,672,707 | B2 | 3/2014 | Nichols et al. |
| 8,678,860 | B2 | 3/2014 | Minich et al. |
| 8,690,589 | B2 | 4/2014 | Ngo |
| 8,690,604 | B2 | 4/2014 | Davis |
| 8,715,003 | B2 | 5/2014 | Buck et al. |
| 8,740,644 | B2 | 6/2014 | Long |
| 8,753,145 | B2 | 6/2014 | Lang et al. |
| 8,758,051 | B2 | 6/2014 | Nonen et al. |
| 8,764,464 | B2 | 7/2014 | Buck et al. |
| 8,771,016 | B2 | 7/2014 | Atkinson et al. |
| 8,787,711 | B2 | 7/2014 | Zbinden et al. |
| 8,804,342 | B2 | 8/2014 | Behziz et al. |
| 8,814,595 | B2 | 8/2014 | Cohen et al. |
| 8,830,679 | B2 | 9/2014 | Scholeno |
| 8,845,364 | B2 | 9/2014 | Wanha et al. |
| 8,858,243 | B2 | 10/2014 | Luo et al. |
| 8,864,521 | B2 | 10/2014 | Atkinson et al. |
| 8,870,471 | B2 | 10/2014 | Ito et al. |
| 8,888,531 | B2 | 11/2014 | Jeon |
| 8,888,533 | B2 | 11/2014 | Westman et al. |
| 8,911,255 | B2 | 12/2014 | Scherer et al. |
| 8,926,377 | B2 | 1/2015 | Kirk et al. |
| 8,944,831 | B2 | 2/2015 | Stoner et al. |
| 8,992,236 | B2 | 3/2015 | Wittig et al. |
| 8,992,237 | B2 | 3/2015 | Regnier et al. |
| 8,998,642 | B2 | 4/2015 | Manter et al. |
| 9,004,942 | B2 | 4/2015 | Paniauqa |
| 9,011,177 | B2 | 4/2015 | Lloyd et al. |
| 9,022,806 | B2 | 5/2015 | Cartier, Jr. et al. |

(56) References Cited

U.S. PATENT DOCUMENTS 9,028,201 B2 5/2015 Kirk et al.
9,028,281 B2 5/2015 Kirk et al.
9,035,183 B2 5/2015 Kodama et al.
9,040,824 B2 5/2015 Guetig et al.
9,071,001 B2 6/2015 Scherer et al.
9,077,118 B2 7/2015 Szu et al.
9,118,151 B2 8/2015 Tran et al.
9,119,292 B2 8/2015 Gundel
9,124,009 B2 9/2015 Atkinson et al.
9,136,634 B2 9/2015 De Geest et al.
9,142,921 B2 9/2015 Wanha et al.
9,203,171 B2 12/2015 Yu et al.
9,210,817 B2 12/2015 Briant
9,214,768 B2 12/2015 Pao et al.
9,219,335 B2 12/2015 Atkinson et al.
9,225,085 B2 12/2015 Cartier, Jr. et al.
9,232,676 B2 1/2016 Sechrist et al.
9,246,251 B2 1/2016 Regnier et al.
9,246,262 B2 1/2016 Brown
9,246,280 B2 1/2016 Neer
9,257,778 B2 2/2016 Buck et al.
9,257,794 B2 2/2016 Wanha et al.
9,276,358 B2 3/2016 Ista
9,281,636 B1 3/2016 Schmitt
9,300,067 B2 3/2016 Yokoo
9,312,618 B2 4/2016 Regnier et al.
9,337,585 B1 5/2016 Yang
9,350,108 B2 5/2016 Long
9,356,401 B1 5/2016 Horning et al.
9,362,678 B2 6/2016 Wanha et al.
9,368,916 B2 6/2016 Heyvaert et al.
9,373,917 B2 6/2016 Sypolt et al.
9,374,165 B2 6/2016 Zbinden et al.
9,385,455 B2 7/2016 Regnier et al.
9,389,368 B1 7/2016 Sharf
9,391,407 B1 7/2016 Bucher et al.
9,413,112 B2 8/2016 Helster et al.
9,450,344 B2 9/2016 Cartier, Jr. et al.
9,490,558 B2 11/2016 Wanha et al.
9,509,101 B2 11/2016 Cartier, Jr. et al.
9,509,102 B2 11/2016 Sharf et al.
9,520,680 B2 12/2016 Hsu et al.
9,520,689 B2 12/2016 Cartier, Jr. et al.
9,531,133 B1 12/2016 Horning et al.
9,553,381 B2 1/2017 Regnier
9,559,446 B1 1/2017 Wetzel et al.
9,564,696 B2 2/2017 Gulla
9,608,348 B2 3/2017 Wanha et al.
9,651,752 B2 5/2017 Zbinden et al.
9,653,829 B2 5/2017 Long
9,660,364 B2 5/2017 Wig et al.
9,666,961 B2 5/2017 Horning et al.
9,668,378 B2 5/2017 Phillips
9,671,582 B2 6/2017 Yeh
9,685,724 B2 6/2017 Tojo
9,685,736 B2 6/2017 Gailus et al.
9,711,901 B2 7/2017 Scholeno
9,735,495 B2 8/2017 Gross
9,761,974 B2 9/2017 L'Esperance et al.
9,774,144 B2 9/2017 Cartier, Jr. et al.
9,801,301 B1 10/2017 Costello
9,829,662 B2 11/2017 Kurashima
9,841,572 B2 12/2017 Zbinden et al.
9,843,135 B2 12/2017 Guetig et al.
9,929,500 B1 3/2018 Ista
9,929,512 B1 3/2018 Trout et al.
9,985,367 B2 5/2018 Wanha et al.
9,985,389 B1 5/2018 Morgan et al.
10,020,614 B1 7/2018 Bucher
10,056,706 B2 8/2018 Wanha et al.
10,062,984 B2 8/2018 Regnier
10,062,988 B1 8/2018 Vinther et al.
10,069,225 B2 9/2018 Wanha et al.
10,096,945 B2 10/2018 Cartier, Jr. et al.
10,109,968 B2 10/2018 Khazen
10,114,182 B2 10/2018 Zbinden et al.
10,128,627 B1 11/2018 Kazav
10,136,517 B2 11/2018 Shirasaki
10,153,571 B2 12/2018 Kachlic
10,170,869 B2 1/2019 Gailus et al.
10,181,663 B2 1/2019 Regnier
10,205,286 B2 2/2019 Provencher et al.
10,243,305 B1 3/2019 Pan et al.
10,276,995 B2 4/2019 Little
10,305,224 B2 5/2019 Girard, Jr.
RE47,459 E 6/2019 Vinther et al.
10,348,007 B2 7/2019 Kataoka et al.
10,367,283 B2 7/2019 L'Esperance et al.
10,367,308 B2 7/2019 Little et al.
10,374,355 B2 8/2019 Ayzenberg et al.
10,381,767 B1 8/2019 Milbrand, Jr. et al.
10,446,960 B2 10/2019 Guy Ritter et al.
10,462,904 B2 10/2019 Shirasaki
10,511,118 B2 12/2019 Beltran et al.
10,551,580 B2 2/2020 Regnier et al.
10,555,437 B2 2/2020 Little
10,588,243 B2 3/2020 Little et al.
10,651,606 B2 5/2020 Little
10,680,364 B2 6/2020 Champion et al.
10,797,417 B2 10/2020 Scholeno et al.
10,840,622 B2 11/2020 Sasame et al.
10,847,930 B2 11/2020 Ayzenberg et al.
10,847,937 B2 11/2020 Cartier, Jr. et al.
10,879,643 B2 12/2020 Astbury et al.
10,944,215 B2 3/2021 Chua et al.
10,958,005 B1 3/2021 Dube
11,050,176 B2 6/2021 Yang et al.
11,070,006 B2 7/2021 Gailus et al.
11,101,611 B2 8/2021 Winey et al.
11,143,830 B2 10/2021 Luo et al.
11,177,592 B2 11/2021 Scholeno et al.
11,189,943 B2 11/2021 Zerebilov et al.
11,205,877 B2 12/2021 Diaz et al.
11,271,348 B1 3/2022 Chen et al.
11,309,655 B2 4/2022 Avery et al.
11,372,178 B2 * 6/2022 Zbinden ............... G02B 6/4268
11,437,762 B2 9/2022 Manter et al.
11,444,404 B2 9/2022 Si et al.
11,509,100 B2 11/2022 Chen et al.
11,637,390 B2 4/2023 Zerebilov et al.
11,670,879 B2 6/2023 Zerebilov
11,677,188 B2 6/2023 Diaz et al.
11,715,922 B2 8/2023 Winey et al.
11,735,852 B2 8/2023 Cartier, Jr. et al.
11,824,311 B2 11/2023 Gailus et al.
2008/0207023 A1 8/2008 Tuin et al.
2008/0246555 A1 10/2008 Kirk et al.
2008/0248658 A1 10/2008 Cohen et al.
2008/0248659 A1 10/2008 Cohen et al.
2008/0248660 A1 10/2008 Kirk et al.
2008/0264673 A1 10/2008 Chi et al.
2008/0267620 A1 10/2008 Cole et al.
2008/0297988 A1 12/2008 Chau
2008/0305689 A1 12/2008 Zhang et al.
2009/0011641 A1 1/2009 Cohen et al.
2009/0011645 A1 1/2009 Laurx et al.
2009/0011664 A1 1/2009 Laurx et al.
2009/0017682 A1 1/2009 Amleshi et al.
2009/0023330 A1 1/2009 Stoner et al.
2009/0051558 A1 2/2009 Dorval
2009/0098767 A1 4/2009 Long
2009/0117386 A1 5/2009 Vacanti et al.
2009/0130913 A1 5/2009 Yi et al.
2009/0130918 A1 5/2009 Nguyen et al.
2009/0166082 A1 7/2009 Liu et al.
2009/0176400 A1 7/2009 Davis et al.
2009/0205194 A1 8/2009 Semba et al.
2009/0215309 A1 8/2009 Mongold et al.
2009/0227141 A1 9/2009 Pan
2009/0239395 A1 9/2009 Cohen et al.
2009/0247012 A1 10/2009 Pan
2009/0269971 A1 10/2009 Tamura et al.
2009/0291593 A1 11/2009 Atkinson et al.
2009/0291596 A1 11/2009 Miyazoe

(56) References Cited

U.S. PATENT DOCUMENTS

| | | | |
|---|---|---|---|
| 2009/0305533 | A1 | 12/2009 | Feldman et al. |
| 2009/0311908 | A1 | 12/2009 | Fogg et al. |
| 2010/0009571 | A1 | 1/2010 | Scherer et al. |
| 2010/0018738 | A1 | 1/2010 | Chen et al. |
| 2010/0078738 | A1 | 4/2010 | Chambers et al. |
| 2010/0081302 | A1 | 4/2010 | Atkinson et al. |
| 2010/0099299 | A1 | 4/2010 | Moriyama et al. |
| 2010/0112850 | A1 | 5/2010 | Rao et al. |
| 2010/0144167 | A1 | 6/2010 | Fedder et al. |
| 2010/0144168 | A1 | 6/2010 | Glover et al. |
| 2010/0144175 | A1 | 6/2010 | Helster et al. |
| 2010/0144201 | A1 | 6/2010 | Defibaugh et al. |
| 2010/0144203 | A1 | 6/2010 | Glover et al. |
| 2010/0177489 | A1 | 7/2010 | Yagisawa |
| 2010/0183141 | A1 | 7/2010 | Arai et al. |
| 2010/0203768 | A1 | 8/2010 | Kondo et al. |
| 2010/0221951 | A1 | 9/2010 | Pepe et al. |
| 2010/0248544 | A1 | 9/2010 | Xu et al. |
| 2010/0291806 | A1 | 11/2010 | Minich et al. |
| 2010/0294530 | A1 | 11/2010 | Atkinson et al. |
| 2011/0003509 | A1 | 1/2011 | Gailus |
| 2011/0034075 | A1 | 2/2011 | Feldman et al. |
| 2011/0067237 | A1 | 3/2011 | Cohen et al. |
| 2011/0074213 | A1 | 3/2011 | Schaffer et al. |
| 2011/0081114 | A1 | 4/2011 | Togami |
| 2011/0104948 | A1 | 5/2011 | Girard, Jr. et al. |
| 2011/0130038 | A1 | 6/2011 | Cohen et al. |
| 2011/0136387 | A1 | 6/2011 | Matsuura et al. |
| 2011/0177699 | A1 | 7/2011 | Crofoot et al. |
| 2011/0212632 | A1 | 9/2011 | Stokoe et al. |
| 2011/0212633 | A1 | 9/2011 | Regnier et al. |
| 2011/0212649 | A1 | 9/2011 | Stokoe et al. |
| 2011/0212650 | A1 | 9/2011 | Amleshi et al. |
| 2011/0223807 | A1 | 9/2011 | Jeon et al. |
| 2011/0230095 | A1 | 9/2011 | Atkinson et al. |
| 2011/0230096 | A1 | 9/2011 | Atkinson et al. |
| 2011/0230104 | A1 | 9/2011 | Lang et al. |
| 2011/0263156 | A1 | 10/2011 | Ko |
| 2011/0287663 | A1 | 11/2011 | Gailus et al. |
| 2011/0300757 | A1 | 12/2011 | Regnier et al. |
| 2011/0300760 | A1 | 12/2011 | Ngo |
| 2012/0003848 | A1 | 1/2012 | Casher et al. |
| 2012/0034798 | A1 | 2/2012 | Khemakhem et al. |
| 2012/0034820 | A1 | 2/2012 | Lang et al. |
| 2012/0052712 | A1 | 3/2012 | Wang |
| 2012/0058665 | A1 | 3/2012 | Zerebilov |
| 2012/0058670 | A1 | 3/2012 | Regnier et al. |
| 2012/0077369 | A1 | 3/2012 | Andersen |
| 2012/0077380 | A1 | 3/2012 | Minich et al. |
| 2012/0094536 | A1 | 4/2012 | Khilchenko et al. |
| 2012/0135643 | A1 | 5/2012 | Lange et al. |
| 2012/0148198 | A1 | 6/2012 | Togami et al. |
| 2012/0156929 | A1 | 6/2012 | Manter et al. |
| 2012/0164860 | A1 | 6/2012 | Wang |
| 2012/0184136 | A1 | 7/2012 | Ritter |
| 2012/0184145 | A1 | 7/2012 | Zeng |
| 2012/0202363 | A1 | 8/2012 | McNamara et al. |
| 2012/0202370 | A1 | 8/2012 | Mulfinger et al. |
| 2012/0202386 | A1 | 8/2012 | McNamara et al. |
| 2012/0214344 | A1 | 8/2012 | Cohen et al. |
| 2012/0221758 | A1 | 8/2012 | Hunkins et al. |
| 2012/0252232 | A1 | 10/2012 | Buck et al. |
| 2012/0329294 | A1 | 12/2012 | Raybold et al. |
| 2013/0012038 | A1 | 1/2013 | Kirk et al. |
| 2013/0017715 | A1 | 1/2013 | Laarhoven et al. |
| 2013/0017733 | A1 | 1/2013 | Kirk et al. |
| 2013/0034999 | A1 | 2/2013 | Szczesny et al. |
| 2013/0040482 | A1 | 2/2013 | Ngo et al. |
| 2013/0065454 | A1 | 3/2013 | Milbrand Jr. |
| 2013/0078870 | A1 | 3/2013 | Milbrand, Jr. |
| 2013/0084744 | A1 | 4/2013 | Zerebilov et al. |
| 2013/0092429 | A1 | 4/2013 | Ellison |
| 2013/0109232 | A1 | 5/2013 | Paniaqua |
| 2013/0143442 | A1 | 6/2013 | Cohen et al. |
| 2013/0164970 | A1 | 6/2013 | Regnier et al. |
| 2013/0196553 | A1 | 8/2013 | Gailus |
| 2013/0210246 | A1 | 8/2013 | Davis et al. |
| 2013/0223036 | A1 | 8/2013 | Herring et al. |
| 2013/0225006 | A1 | 8/2013 | Khilchenko et al. |
| 2013/0273781 | A1 | 10/2013 | Buck et al. |
| 2013/0288513 | A1 | 10/2013 | Masubuchi et al. |
| 2013/0288521 | A1 | 10/2013 | McClellan et al. |
| 2013/0288525 | A1 | 10/2013 | McClellan et al. |
| 2013/0288539 | A1 | 10/2013 | McClellan et al. |
| 2013/0340251 | A1 | 12/2013 | Regnier et al. |
| 2014/0004724 | A1 | 1/2014 | Cartier, Jr. et al. |
| 2014/0004726 | A1 | 1/2014 | Cartier, Jr. et al. |
| 2014/0004746 | A1 | 1/2014 | Cartier, Jr. et al. |
| 2014/0035755 | A1 | 2/2014 | Ward |
| 2014/0041937 | A1 | 2/2014 | Lloyd et al. |
| 2014/0057475 | A1 | 2/2014 | Tohjo |
| 2014/0057493 | A1 | 2/2014 | De Geest et al. |
| 2014/0057494 | A1 | 2/2014 | Cohen |
| 2014/0057498 | A1 | 2/2014 | Cohen |
| 2014/0065883 | A1 | 3/2014 | Cohen et al. |
| 2014/0073174 | A1 | 3/2014 | Yang |
| 2014/0073181 | A1 | 3/2014 | Yang |
| 2014/0099844 | A1 | 4/2014 | Dunham |
| 2014/0154912 | A1 | 6/2014 | Hirschy |
| 2014/0193993 | A1 | 7/2014 | Meng |
| 2014/0199885 | A1 | 7/2014 | Vinther et al. |
| 2014/0242844 | A1 | 8/2014 | Wanha et al. |
| 2014/0273551 | A1 | 9/2014 | Resendez et al. |
| 2014/0273557 | A1 | 9/2014 | Cartier, Jr. et al. |
| 2014/0273627 | A1 | 9/2014 | Cartier, Jr. et al. |
| 2014/0286613 | A1 | 9/2014 | Ito et al. |
| 2014/0287627 | A1 | 9/2014 | Cohen |
| 2014/0295680 | A1 | 10/2014 | YuQiang et al. |
| 2014/0302706 | A1 | 10/2014 | YuQiang et al. |
| 2014/0308852 | A1 | 10/2014 | Gulla |
| 2014/0334792 | A1 | 11/2014 | Bragg |
| 2014/0335707 | A1 | 11/2014 | Johnescu et al. |
| 2014/0335736 | A1 | 11/2014 | Regnier et al. |
| 2015/0056856 | A1 | 2/2015 | Atkinson et al. |
| 2015/0072561 | A1 | 3/2015 | Schmitt et al. |
| 2015/0079814 | A1 | 3/2015 | Tamai |
| 2015/0079829 | A1 | 3/2015 | Brodsgaard |
| 2015/0079845 | A1 | 3/2015 | Wanha et al. |
| 2015/0093083 | A1 | 4/2015 | Tsai et al. |
| 2015/0132990 | A1 | 5/2015 | Nong Chou et al. |
| 2015/0180578 | A1 | 6/2015 | Leigh et al. |
| 2015/0194751 | A1 | 7/2015 | Herring |
| 2015/0200483 | A1 | 7/2015 | Martin et al. |
| 2015/0200496 | A1 | 7/2015 | Simpson et al. |
| 2015/0207247 | A1 | 7/2015 | Regnier et al. |
| 2015/0236450 | A1 | 8/2015 | Davis |
| 2015/0236451 | A1 | 8/2015 | Cartier, Jr. et al. |
| 2015/0236452 | A1 | 8/2015 | Cartier, Jr. et al. |
| 2015/0255926 | A1 | 9/2015 | Paniagua |
| 2015/0280351 | A1 | 10/2015 | Bertsch |
| 2015/0280368 | A1 | 10/2015 | Bucher |
| 2015/0288110 | A1 | 10/2015 | Tanguchi et al. |
| 2015/0303608 | A1 | 10/2015 | Zerebilov et al. |
| 2015/0357736 | A1 | 12/2015 | Tran et al. |
| 2015/0357747 | A1 | 12/2015 | Filipon et al. |
| 2015/0357761 | A1 | 12/2015 | Wanha et al. |
| 2016/0004022 | A1 | 1/2016 | Ishii |
| 2016/0013594 | A1 | 1/2016 | Costello et al. |
| 2016/0013596 | A1 | 1/2016 | Regnier |
| 2016/0028189 | A1 | 1/2016 | Resendez et al. |
| 2016/0054527 | A1 | 2/2016 | Tang et al. |
| 2016/0104956 | A1 | 4/2016 | Santos et al. |
| 2016/0104990 | A1 | 4/2016 | Laurx et al. |
| 2016/0111825 | A1 | 4/2016 | Wanha et al. |
| 2016/0131859 | A1 | 5/2016 | Ishii et al. |
| 2016/0141807 | A1 | 5/2016 | Gailus et al. |
| 2016/0149343 | A1 | 5/2016 | Atkinson et al. |
| 2016/0149362 | A1 | 5/2016 | Ritter et al. |
| 2016/0150633 | A1 | 5/2016 | Cartier, Jr. |
| 2016/0150639 | A1 | 5/2016 | Gailus et al. |
| 2016/0150645 | A1 | 5/2016 | Gailus et al. |
| 2016/0156133 | A1 | 6/2016 | Masubuchi et al. |
| 2016/0172803 | A1 | 6/2016 | Tamai |
| 2016/0174412 | A1 | 6/2016 | Karaaslan et al. |

(56) References Cited

U.S. PATENT DOCUMENTS

2016/0181713 A1 6/2016 Peloza et al.
2016/0181732 A1 6/2016 Laurx et al.
2016/0190747 A1 6/2016 Regnier et al.
2016/0197423 A1 7/2016 Regnier
2016/0211623 A1 7/2016 Sharf et al.
2016/0218455 A1 7/2016 Sayre et al.
2016/0233598 A1 8/2016 Wittig
2016/0268714 A1 9/2016 Wanha et al.
2016/0268739 A1 9/2016 Zerebilov et al.
2016/0274316 A1 9/2016 Verdiell
2016/0308296 A1 10/2016 Pitten et al.
2016/0315425 A1 10/2016 Nishimori et al.
2016/0322770 A1 11/2016 Zerebilov
2016/0336692 A1 11/2016 Champion et al.
2016/0344141 A1 11/2016 Cartier, Jr. et al.
2017/0025783 A1 1/2017 Astbury et al.
2017/0033478 A1 2/2017 Wanha et al.
2017/0042070 A1 2/2017 Baumler et al.
2017/0047692 A1 2/2017 Cartier, Jr. et al.
2017/0054234 A1 2/2017 Kachlic
2017/0054250 A1 2/2017 Kim et al.
2017/0077643 A1 3/2017 Zbinden et al.
2017/0093093 A1 3/2017 Cartier, Jr. et al.
2017/0098901 A1 4/2017 Regnier
2017/0162960 A1 6/2017 Wanha et al.
2017/0222374 A1 8/2017 Saito et al.
2017/0285282 A1 10/2017 Regnier et al.
2017/0294743 A1 10/2017 Gailus et al.
2017/0302011 A1 10/2017 Wanha et al.
2017/0338595 A1 11/2017 Girard, Jr.
2017/0365942 A1 12/2017 Regnier
2017/0365943 A1 12/2017 Wanha et al.
2018/0006416 A1 1/2018 Lloyd et al.
2018/0034175 A1 2/2018 Lloyd et al.
2018/0034190 A1 2/2018 Ngo
2018/0040989 A1 2/2018 Chen
2018/0062323 A1 3/2018 Kirk et al.
2018/0089966 A1 3/2018 Ward
2018/0109043 A1 4/2018 Provencher et al.
2018/0145438 A1 5/2018 Cohen
2018/0212385 A1 7/2018 Little
2018/0219331 A1 8/2018 Cartier, Jr. et al.
2018/0219332 A1 8/2018 Brungard et al.
2018/0269612 A1 9/2018 Pitten et al.
2018/0278000 A1 9/2018 Regnier
2018/0287280 A1 10/2018 Ratkovic
2018/0309214 A1 10/2018 Lloyd et al.
2018/0366880 A1 12/2018 Zerebilov et al.
2019/0013617 A1 1/2019 Ayzenberg et al.
2019/0013625 A1 1/2019 Gailus et al.
2019/0020155 A1 1/2019 Trout et al.
2019/0044284 A1 2/2019 Dunham
2019/0115677 A1 4/2019 Kachlic
2019/0157812 A1 5/2019 Gailus et al.
2019/0173236 A1 6/2019 Provencher et al.
2019/0181582 A1 6/2019 Beltran et al.
2019/0191094 A1 6/2019 Khoe et al.
2019/0260147 A1 8/2019 Pitten et al.
2020/0076455 A1 3/2020 Sharf
2020/0091637 A1 3/2020 Scholeno et al.
2020/0142142 A1 5/2020 Luo et al.
2020/0220289 A1 7/2020 Scholeno et al.
2020/0244025 A1 7/2020 Winey et al.
2020/0274267 A1 8/2020 Zerebilov
2020/0274295 A1 8/2020 Briant
2020/0274301 A1 8/2020 Manter et al.
2021/0021085 A1 1/2021 Diaz et al.
2021/0091496 A1 3/2021 Cartier, Jr. et al.
2021/0098927 A1 4/2021 Si et al.
2021/0234291 A1 7/2021 Zerebilov
2021/0305731 A1 9/2021 Klein et al.
2021/0384691 A1 12/2021 Winey et al.
2021/0399455 A1 12/2021 Wang et al.
2022/0013960 A1* 1/2022 Guetig ............... H01R 13/5205
2022/0013962 A1 1/2022 Gailus et al.
2022/0094111 A1 3/2022 Duan et al.
2022/0158371 A1 5/2022 Zerebilov et al.
2022/0173550 A1 6/2022 Liu et al.
2022/0224057 A1 7/2022 Diaz et al.
2022/0287205 A1 9/2022 Huang et al.
2022/0352675 A1 11/2022 Zerebilov et al.
2023/0006390 A1 1/2023 Si et al.
2023/0253722 A1 8/2023 Zerebilov
2023/0299518 A1 9/2023 Zerebilov et al.
2023/0307854 A1 9/2023 Pritchard et al.
2023/0352866 A1 11/2023 Cartier, Jr. et al.

FOREIGN PATENT DOCUMENTS

CN 101312275 A 11/2008
CN 101330172 A 12/2008
CN 101330173 A 12/2008
CN 101364692 A 2/2009
CN 201229997 Y 4/2009
CN 101752700 A 6/2010
CN 201562814 U 8/2010
CN 102106046 A 6/2011
CN 201956529 U 8/2011
CN 102570152 A 7/2012
CN 102598430 A 7/2012
CN 102823073 A 12/2012
CN 202678544 U 1/2013
CN 102986091 A 3/2013
CN 103140994 A 6/2013
CN 103682705 A 3/2014
CN 103969768 A 8/2014
CN 104025393 A 9/2014
CN 104518363 4/2015
CN 104779467 A 7/2015
CN 105051978 A 11/2015
CN 105612671 A 5/2016
CN 105811154 A 7/2016
CN 105826740 A 8/2016
CN 106030925 A 10/2016
CN 106104933 A 11/2016
CN 107111075 A 8/2017
CN 107408769 A 11/2017
CN 107454794 A 12/2017
CN 107645072 A 1/2018
CN 108028481 A 5/2018
CN 108475891 A 8/2018
CN 108713355 10/2018
CN 109273932 A 1/2019
CN 109980386 A 7/2019
CN 111769395 A 10/2020
CN 111769396 A 10/2020
CN 212412345 U 1/2021
CN 212571566 U 2/2021
CN 213151165 U 5/2021
CN 112993659 A 6/2021
CN 113078510 A 7/2021
CN 214100162 U 8/2021
CN 113422243 A 9/2021
CN 215184602 U 12/2021
CN 115347395 A 11/2022
EP 2 169 770 A2 3/2010
JP 2010-266729 A 11/2010
JP 2011-018651 A 1/2011
JP 2012-516021 A 7/2012
JP 2014-195061 A 10/2014
JP 2016-528688 A 9/2016
JP 6193595 B2 9/2017
JP 6599548 B2 10/2019
JP 1656986 S 4/2020
JP 1668637 S 9/2020
JP 1668730 S 9/2020
KR 10-2010-0055197 A 5/2010
KR 10-2015-0067010 A 6/2015
KR 10-2015-0101020 A 9/2015
KR 10-2016-0038192 A 4/2016
KR 10-2016-0076334 A 6/2016
TW 200910710 A 3/2009
TW M357771 U 5/2009
TW M403134 U 5/2011

(56) References Cited

FOREIGN PATENT DOCUMENTS

| | | | |
|---|---|---|---|
| TW | 201320504 | A | 5/2013 |
| TW | I446657 | B | 7/2014 |
| TW | I465333 | B | 12/2014 |
| TW | 201521295 | A | 6/2015 |
| TW | I489002 | B | 6/2015 |
| TW | 201637298 | A | 10/2016 |
| TW | I600222 | B | 9/2017 |
| TW | D209874 | S1 | 2/2021 |
| WO | WO 2008/124057 | A1 | 10/2008 |
| WO | WO 2010/039188 | A1 | 4/2010 |
| WO | WO 2012/078434 | A2 | 6/2012 |
| WO | WO 2013/006592 | A2 | 1/2013 |
| WO | WO 2015/013430 | A1 | 1/2015 |
| WO | WO 2015/112717 | A1 | 7/2015 |
| WO | WO 2017/015470 | A1 | 1/2017 |
| WO | WO 2017/123574 | | 7/2017 |
| WO | WO 2017/164418 | A1 | 9/2017 |
| WO | WO 2017/218771 | A1 | 12/2017 |
| WO | WO 2018/226805 | A1 | 12/2018 |
| WO | WO 2019/195319 | | 10/2019 |
| WO | WO 2021/070273 | A1 | 4/2021 |

OTHER PUBLICATIONS

Chinese Office Action dated Feb. 20, 2023 in connection with Chinese Application No. 202080019763.4.

International Search Report and Written Opinion for International Application No. PCT/US2020/014826, mailed May 27, 2020.

[No Author Listed], Amphenol TCS expands the Xcede Platform with 85 Ohm Connectors and High-Speed Cable Solutions. Press Release. Published Feb. 25, 2009. http://www.amphenol.com/about/news_archive/2009/58 [Retrieved on Mar. 26, 2019 from Wayback Machine]. 4 pages.

[No Author Listed], Agilent. Designing Scalable 10G Backplane Interconnect Systems Utilizing Advanced Verification Methodologies. White Paper, Published May 5, 2012. 24 pages.

[No Author Listed], Difference Between Weld Metal and Heat Affected Zone (HAZ). Minaprem.com. 2021. 7 pages. URL:http://www.difference.minaprem.com/joining/difference-between-weld-metal-and-heat-affected-zone-haz [date retrieved Dec. 20, 2021].

[No Author Listed], Hitachi Cable America Inc. Direct Attach Cables. 8 pages. Retrieved Aug. 10, 2017 from http://www.hca.hitachi-cable.com/products/hca/catalog/pdfs/direct-attach-cable-assemblies.pdf [last accessed Mar. 6, 2019].

[No Author Listed], INF-8628 Specification for QSFP-DD 8X Transceiver (QSFP Double Density) Rev 0.0 Jun. 27, 2016. SNIA SFF TWG Technology Affiliate. 1 page.

[No Author Listed], SFF-8663 Specification for QSFP+ 28 GB/s Cage (Style A) Rev 1.7. Oct. 19, 2017. SNIA SFF TWG Technology Affiliate. 18 pages.

[No Author Listed], Specification for Quad Small Form Factor Pluggable Module 112. QSFP112 Published Specification Rev. 2.0. QSFP112 Multi-Source Agreement. Jan. 22, 2022. 55 pages.

[No Author Listed], What is the Heat Affected Zone (HAZ)? TWI Ltd. 2021. 8 pages. URL:https://www.twi-global.com/technical-knowledge/faqs/what-is-the-heat-affected-zone [date retrieved Dec. 20, 2021].

Cartier et al., High Speed Electronic System With Midboard Cable Connector, U.S. Appl. No. 18/347,820, filed Jul. 6, 2023.

Diaz et al., Controlled-Impedance Compliant Cable Termination, U.S. Appl. No. 18/321,754, filed May 22, 2023.

Lehto et al., Characterisation of local grain size variation of welded structural steel. Weld World. 2016;60:673-688. 16 pages. URL:https://link.springer.com/content/pdf/10.1007/s40194-016-0318-8.pdf.

Lloyd et al., High Speed Bypass Cable Assembly, U.S. Appl. No. 15/271,903, filed Sep. 21, 2016.

Lloyd et al., High Speed Bypass Cable Assembly, U.S. Appl. No. 15/715,939, filed Sep. 26, 2017.

Palkert (ed), QSFP-DD Overview. Mar. 14, 2017. 19 pages. URL:http://www.qsfp-dd.com.

Zerebilov et al., I/O Connector Configured For Cable Connection To A Midboard, U.S. Appl. No. 18/136,827, filed Apr. 19, 2023.

Taiwanese Office Action dated Nov. 28, 2023 in connection with Taiwanese Application No. 109102915.

Fan et al., Compact High-Speed Electrical Connector, U.S. Appl. No. 18/494,129, filed Oct. 25, 2023.

* cited by examiner

I/O CONNECTOR CONFIGURED FOR CABLED CONNECTION TO THE MIDBOARD

CROSS-REFERENCE TO RELATED APPLICATIONS

This application is a continuation of U.S. patent application Ser. No. 17/407,129, filed on Aug. 19, 2021, entitled "I/O CONNECTOR CONFIGURED FOR CABLED CONNECTION TO THE MIDBOARD," which is a divisional of U.S. patent application Ser. No. 16/751,013, filed on Jan. 23, 2020, entitled "I/O CONNECTOR CONFIGURED FOR CABLED CONNECTION TO THE MIDBOARD," which claims priority to and the benefit under 35 U.S.C. § 119(e) to U.S. Provisional Application Ser. No. 62/860,753, filed on Jun. 12, 2019, entitled "I/O CONNECTOR CONFIGURED FOR CABLED CONNECTION TO THE MIDBOARD." U.S. application Ser. No. 16/751,013 also claims priority to and the benefit under 35 U.S.C. § 119(e) to U.S. Provisional Application Ser. No. 62/796,837, filed on Jan. 25, 2019, entitled "I/O CONNECTOR CONFIGURED FOR CABLED CONNECTION TO THE MIDBOARD." The contents of these applications are incorporated herein by reference in their entirety.

BACKGROUND

This patent application relates generally to interconnection systems, such as those including electrical connectors, used to interconnect electronic assemblies.

Electrical connectors are used in many electronic systems. It is generally easier and more cost effective to manufacture a system as separate electronic assemblies, such as printed circuit boards (PCBs), which may be joined together with electrical connectors. A known arrangement for joining several printed circuit boards is to have one printed circuit board serve as a backplane. Other printed circuit boards, called "daughterboards" or "daughtercards," may be connected through the backplane.

A backplane is a printed circuit board onto which many connectors may be mounted. Conducting traces in the backplane may be electrically connected to signal conductors in the connectors so that signals may be routed between the connectors. Daughtercards may also have connectors mounted thereon. The connectors mounted on a daughtercard may be plugged into the connectors mounted on the backplane. In this way, signals may be routed among the daughtercards through the backplane. The daughtercards may plug into the backplane at a right angle. The connectors used for these applications may therefore include a right angle bend and are often called "right angle connectors."

Connectors may also be used in other configurations for interconnecting printed circuit boards. Sometimes, one or more smaller printed circuit boards may be connected to another larger printed circuit board. In such a configuration, the larger printed circuit board may be called a "motherboard" and the printed circuit boards connected to it may be called daughterboards. Also, boards of the same size or similar sizes may sometimes be aligned in parallel. Connectors used in these applications are often called "stacking connectors" or "mezzanine connectors."

Connectors may also be used to enable signals to be routed to or from an electronic device. A connector, called an "input/output (I/O) connector" may be mounted to a printed circuit board, usually at an edge of the printed circuit board. That connector may be configured to receive a plug at one end of a cable assembly, such that the cable is connected to the printed circuit board through the I/O connector. The other end of the cable assembly may be connected to another electronic device.

Cables have also been used to make connections within the same electronic device. The cables may be used to route signals from an I/O connector to a processor assembly that is located in the interior of a printed circuit board, away from the edge at which the I/O connector is mounted. In other configurations, both ends of a cable may be connected to the same printed circuit board. The cables can be used to carry signals between components mounted to the printed circuit board near where each end of the cable connects to the printed circuit board.

Cables provide signal paths with high signal integrity, particularly for high frequency signals, such as those above 40 Gbps using an NRZ protocol. Cables are often terminated at their ends with electrical connectors that mate with corresponding connectors on the electronic devices, enabling quick interconnection of the electronic devices. Each cable is comprised of one or more signal conductors embedded in a dielectric and wrapped by a conductive layer. A protective jacket, often made of plastic, may surround these components. Additionally, the jacket or other portions of the cable may include fibers or other structures for mechanical support.

One type of cable, referred to as a "twinax cable," is constructed to support transmission of a differential signal and has a balanced pair of signal wires embedded in a dielectric and wrapped by a conductive layer. The conductive layer is usually formed using foil, such as aluminized Mylar. The twinax cable can also have a drain wire. Unlike a signal wire, which is generally surrounded by a dielectric, the drain wire may be uncoated so that it contacts the conductive layer at multiple points over the length of the cable. At an end of the cable, where the cable is to be terminated to a connector or other terminating structure, the protective jacket, dielectric and the foil may be removed, leaving portions of the signal wires and the drain wire exposed at the end of the cable. These wires may be attached to a terminating structure, such as a connector. The signal wires may be attached to conductive elements serving as mating contacts in the connector structure. The drain wire may be attached to a ground conductor in the terminating structure. In this way, any ground return path may be continued from the cable to the terminating structure.

SUMMARY

In some aspects, embodiments of a receptacle connector and cage may be simply assembled, even though the receptacle connector includes both conductive elements that are mounted to a printed circuit board and conductive elements that terminate cables that pass through the cage for routing to the midboard.

According to various aspects of the present disclosure, there is provided a method of mounting a receptacle connector, configured for making cabled connections to a remote portion of a printed circuit board, to a cage configured to enclose the receptacle connector. The method comprises inserting the receptacle connector into a channel in the cage, engaging the receptacle connector with a first retention member of the cage, engaging the receptacle connector with a second retention member of the cage such that the receptacle connector is arranged between the first retention member and the second retention member.

According to various aspects of the present disclosure, there is provided a connector assembly configured to be mounted to a printed circuit board and configured for making cabled connections to a remote portion of the printed circuit board. The system comprises a conductive cage configured to be mounted to the printed circuit board, wherein the conductive cage comprises at least one channel configured to receive a transceiver, a receptacle connector comprising a plurality of conductive elements configured to mate with conductive elements of the transceiver, and a cable comprising a plurality of conductors terminated to conductive elements of the receptacle connector and configured to be coupled to the remote portion of the printed circuit board, The receptacle connector is disposed within the channel of the cage with at least a portion of the cable disposed outside of the cage, engaged with a first retention member of the cage, and engaged with a second retention member of the cage such that the receptacle connector is positioned within the channel between the first retention member and the second retention member.

According to various aspects of the present disclosure, there is provided a method of operating a connector assembly mounted to a printed board and comprising a cage and a receptacle connector. The cage comprises a channel and a tab extending into the channel with the position of the receptacle connector based in part on the position of the tab. The method comprises inserting a plug into the channel, mating the plug and the receptacle, and establishing the insertion depth of the plug into the receptacle based on interference between the tab and the plug such that a relative position of the plug and receptacle is based at least in part on the tab.

The foregoing features may be used separately or in any suitable combination. The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DESCRIPTION OF PREFERRED EMBODIMENTS

Figure 1:
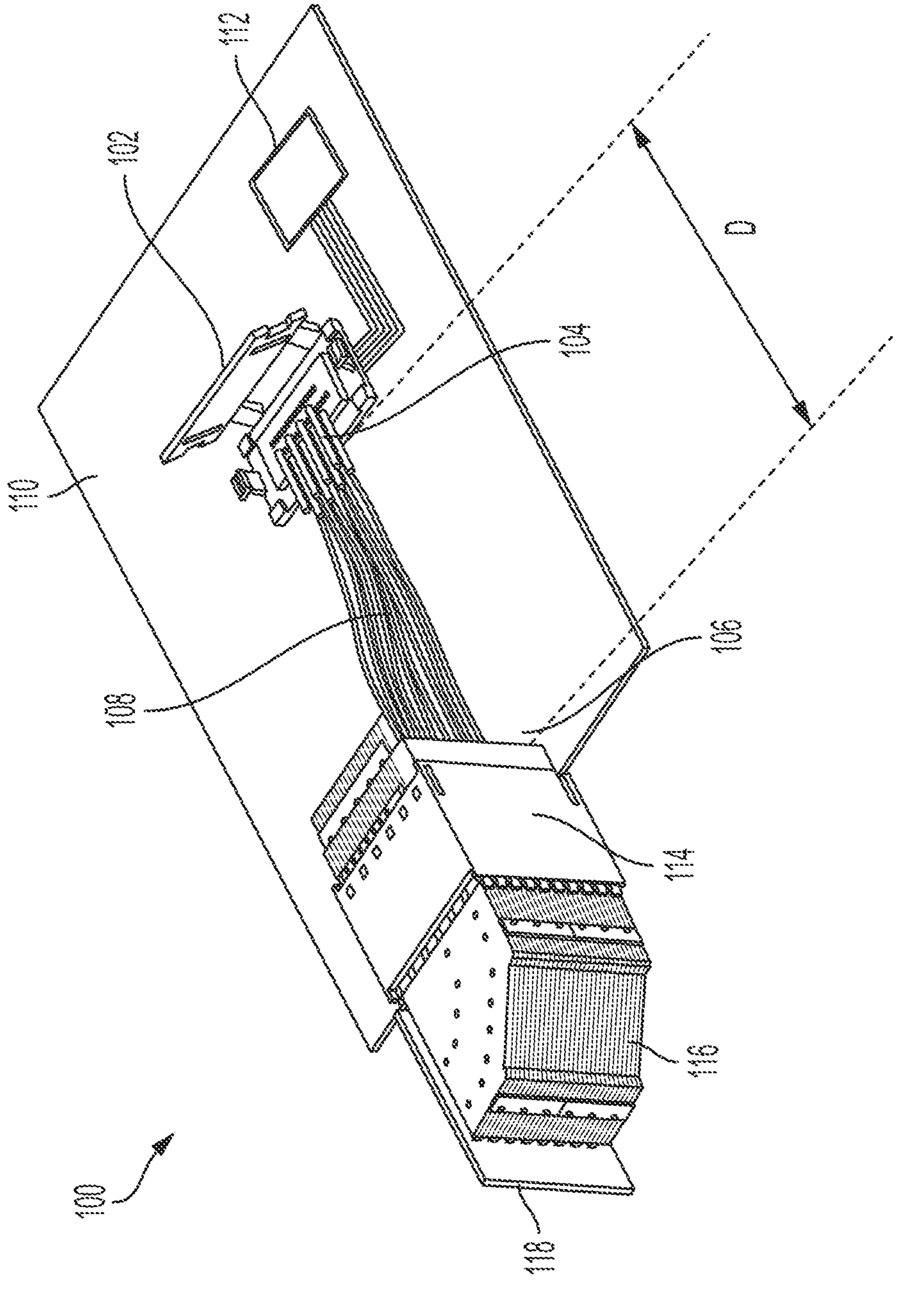
FIG. 1 is an isometric view of an illustrative midboard cable termination assembly disposed on a printed circuit board, in accordance with some embodiments.

The inventors have recognized and appreciated techniques that enable electrical connections with high signal integrity to be made from locations outside an electronic system to locations at the interior of a printed circuit board inside the system. Such connections may be made through an input/output (I/O) connector configured to receive a plug of an active optical cable (AOC) assembly or other external connection. That connector may be configured with terminations to cables that may route signals from the I/O connector to midboard locations. The I/O connector may also be configured to couple signals to or from the printed circuit board directly.

The inventors have recognized and appreciated that an I/O connector configured both for mounting to a printed circuit board and for terminating cables that may route signals to a midboard without passing through the printed circuit board pose manufacturing and mechanical robustness challenges. They have also recognized and appreciated connector and cage designs that can overcome these challenges. In some embodiments, an I/O connector, configured as a receptacle connector, may be inserted into a cage through an opening in the top of the cage. The receptacle connector may have multiple conductive elements with mating contact portions configured to mate with a plug inserted into the receptacle. Some or all of the conductive elements may serve as signal conductors, and some or all of the signal conductors may be connected to cables that may be used to route signals to a midboard location. In some embodiments, some of the conductive elements may have contact tails for attachment to a printed circuit board to which the I/O connector assembly is mounted. The contact tails, for example, may be pressfits that are inserted into vias in the PCB or surface mount tails that are surface mount soldered to pads on the PCB. These conductive elements may server as signal conductors that carry low speed signals or power. Alternatively or additionally, low speed signals or power may be routed through cables, to a remote location in an electronic system.

Other techniques for facilitating assembly may include inserting a receptacle connector into the rear of a cage. The receptacle connector may have multiple signal conductors terminating cables, which may extend from the rear of the cage. The receptacle and/or the cage may be configured to latch the receptacle in place in the cage. This approach may be used with a cage configured to receive a single plug, but may also be used with cages that receive multiple plugs, such as in a stacked configuration or a ganged configuration.

The inventors have also recognized and appreciated techniques for increasing the operating frequency range of such an I/O connector. An I/O connector may include a receptacle mounted in a cage that mates with a plug inserted into a channel of the cage. The cage may be used to position the receptacle connector and/or the plug connector that is inserted into it. Positioning one or both of the mating connectors relative to the cage may reduce the tolerance with which the connectors are positioned when mated, which in turn may enable the nominal and/or maximum wipe length of the connector to be reduced. A reduced wipe length leads to shorter electrical stubs in the mating interface, which, in turn, increases the operating frequency range of the mated connectors. In some embodiments, the cage may be made of sheet metal, and one or more tabs cut into the cage may establish a position of the one or both of the mating connectors. For example, the receptacle connector may press against one side of the tab and the plug may press against the other side of the tab, such that the same feature or features of the cage position both the plug and receptacle when mated.

Techniques described herein may improve signal integrity by reducing the tolerance between mating contact portions of a receptacle connectors and mating contact portions of conductive elements within a plug connector configured to be inserted into the receptacle connector. Techniques for reducing tolerance may enable mating contact portions of connectors to reliably function with reduced wipe during mating, which in turn, may reduce the length of stubs in the mating interface of mated connectors, which may improve signal integrity.

For example, a receptacle connector may be engaged with a cage, where the cage is stamped by a die and therefore has low variation in dimensions. In some embodiments, forming parts by stamping metal may provide more accurately dimensioned parts than parts formed by other processes, for example, parts formed by plastic molding. By engaging the receptacle connector directly to features of the cage, contact portions of the terminal subassemblies may be positioned with low variability. The position of a plug mated with the receptacle connector may also be established by engaging the plug with features on the cage, leading to less variability from connector to connector. By reducing variability of the relative position of connectors, the plug configured for mating with the receptacle connector may be designed with shorter pads, in turn reducing stub lengths.

A tab may be used to establish insertion depth of a plug inserted into a receptacle connector based on interference between the tab and the plug. For example, the tab may prevent the plug from being inserted beyond the plug by physically blocking further insertion of the plug. In this manner, the tab may establish, at least in part, a relative position of the plug and receptacle connector. The same tab may similarly establish a position of a receptacle connector by interference between the tab and the receptacle connector. For example, a surface of the receptacle may be engaged with a first surface of the tab and a surface of the plug may be engaged with a second surface of the tab, where the second surface of the tab is opposite the first surface of the tab.

When both a plug and a receptacle connector of an electrical assembly are positioned relative to a cage, a number of stacked tolerances of the electrical assembly may be reduced, for example, compared to a configuration where the position of a receptacle connector is instead determined relative to a printed circuit board that the cage is mounted to. Reduced tolerances may enable mating contact portions of connectors to reliably function with reduced wipe during mating, in turn, reducing stub length for the mating interface of mated connectors. By reducing stub lengths, resonances may occur at frequencies that do not interfere with operation of the connector, even at relatively high frequencies, such as up to at least 25 GHz, up to at least 56 GHz or up to at least 112 GHz, up to at least 200 GHz, or greater, according to some embodiments.

Techniques as described herein may facilitate both types of connections being made with high signal integrity, but in a simple and low cost way.

FIG. 1 shows an isometric view 100 of an illustrative electronic system in which a cabled connection is made between a connector mounted at the edge of a printed circuit board and a midboard cable termination assembly disposed on a printed circuit board. In the illustrated example, the midboard cable termination assembly is used to provide a low loss path for routing electrical signals between one or more components, such as component 112, mounted to printed circuit board 110 and a location off the printed circuit board. Component 112, for example, may be a processor or other integrated circuit chip. However, any suitable component or components on printed circuit board 110 may receive or generate the signals that pass through the midboard cable termination assembly.

In the illustrated example, the midboard cable termination assembly couples signals between component 112 and printed circuit board 118. Printed circuit board 118 is shown to be orthogonal to circuit board 110. Such a configuration may occur in a telecommunications switch or other types of electronic equipment. However, a midboard cable termination assembly may be used to couple signals between a location in the interior of a printed circuit board and one or more other locations, such as a transceiver terminating an active optical cable assembly.

In the example of FIG. 1, the connector 114 mounted at the edge of printed circuit board 110 is configured to support connections between orthogonal printed circuit boards rather than configured as an I/O connector. Nonetheless, it illustrates cabled connections, for at least some of the signals passing through connector 114, which is a technique that may be similarly applied in an I/O connector.

FIG. 1 shows a portion of an electronic system including midboard cable termination assembly 102, cables 108, component 112, right angle connector 114, connector 116, and printed circuit boards (PCBs) 110, 118. Midboard cable termination assembly 102 may be mounted on PCB 110 near component 112, which is also mounted on PCB 110. Midboard cable termination assembly 102 may be electrically connected to component 112 via traces in PCB 110. Other suitable connection techniques, however, may be used instead of or in addition to traces in a PCB. In other embodiments, for example, midboard cable termination assembly 102 may be mounted to a component package containing a lead frame with multiple leads, such that signals may be coupled between midboard cable termination assembly 102 and the component through the leads.

Cables 108 may electrically connect midboard cable termination assembly 102 to a location remote from component 112 or otherwise remote from the location at which midboard cable termination assembly 102 is attached to PCB 110. In the illustrated embodiment, a second end of cable 108 is connected to right angle connector 114. Connector 114 is shown as an orthogonal connector that can make separable electrical connections to connector 116 mounted on a surface of printed circuit board 118 orthogonal to printed circuit board 110. Connector 114, however, may have any suitable function and configuration.

In the embodiment illustrated, connector 114 includes one type of connector unit mounted to PCB 110 and another type of connector unit terminating cables 108. Such a configuration enables some signals routed through connector 114 to connector 116 to be connected to traces in PCB 110 and other signals to pass through cables 108. In some embodiments, higher frequency signals, such as signals above 10 GHz or above 25 GHz in some embodiments, may be connected through cables 108.

In the illustrated example, the midboard cable termination assembly 102 is electrically connected to connector 114. However, the present disclosure is not limited in this regard. The midboard cable termination assembly 102 may be electrically connected to any suitable type of connector or component capable of accommodating and/or mating with the second ends 106 of cables 108.

Cables 108 may have first ends 104 attached to midboard cable termination assembly 102 and second ends 106 attached to connector 114. Cables 108 may have a length that enables midboard cable termination assembly 102 to be spaced from second ends 106 at connector 114 by a distance D.

In some embodiments, the distance D may be longer than the distance over which signals at the frequencies passed through cables 108 could propagate along traces within PCB 110 with acceptable losses. Any suitable value, however, may be selected for distance D. In some embodiments, D may be at least six inches, in the range of one to 20 inches, or any value within the range, such as between six and 20 inches. However, the upper limit of the range may depend on the size of PCB 110 and the distance from midboard cable termination assembly 102 that components, such as component 112, are mounted to PCB 110. For example, component 112 may be a microchip or another suitable high-speed component that receives or generates signals that pass through cables 108.

Midboard cable termination assembly 102 may be mounted near components, such as component 112, which receive or generate signals that pass through cables 108. As a specific example, midboard cable termination assembly 102 may be mounted within six inches of component 112, and in some embodiments, within four inches of component 112 or within two inches of component 112. Midboard cable termination assembly 102 may be mounted at any suitable location at the midboard, which may be regarded as the interior regions of PCB 110, set back equal distances from the edges of PCB 110 so as to occupy less than 80% of the area of PCB 110.

Midboard cable termination assembly 102 may be configured for mounting on PCB 110 in a manner that allows for ease of routing of signals coupled through connector 114. For example, the footprint associated with mounting midboard cable termination assembly 102 may be spaced from the edge of PCB 110 such that traces may be routed out of that portion of the footprint in all directions, such as toward component 112. In contrast, signals coupled through connector 114 into PCB 110 will be routed out of a footprint of connector 114 toward the midboard.

Further, connector 114 is attached with eight cables aligned in a column at second ends 106. The column of cables are arranged in a 2×4 array at first ends 104 attached to midboard cable termination assembly 102. Such a configuration, or another suitable configuration selected for midboard cable termination assembly 102, may result in relatively short breakout regions that maintain signal integrity in connecting to an adjacent component in comparison to routing patterns that might be required were those same signals routed out of a larger footprint.

The inventors have recognized and appreciated that signal traces in printed circuit boards may not provide the signal density and/or signal integrity required for transmitting high-speed signals, such as those of 25 GHz or higher, between high-speed components mounted in the midboard and connectors or other components at the periphery of the PCB. Instead, signal traces may be used to electrically connect a midboard cable termination assembly to a high-speed component at short distance, and in turn, the midboard cable termination assembly may be configured to receive termination ends of one or more cables carrying the signal over a large distance. Using such a configuration may allow for greater signal density and integrity to and from a high-speed component on the printed circuit board.

FIG. 1 shows an illustrative midboard cable termination assembly 102. Other suitable termination assemblies may be used. Cables 108, for example, may be terminated at their midboard end with a plug connector, which may be inserted into a receptacle mounted to printed circuit board 110. Alternatively, the midboard end of cables 108 may be attached to pressfits or other conductive elements that may be directly attached to PCB 110 without a plug connector. Alternatively or additionally, the midboard end of cables 108 may be terminated to component 112, directly or through a connector.

The connector at the edge of printed circuit board 110 may similarly be formatted for other architectures and may, for example, be an I/O connector.

Figure 2:
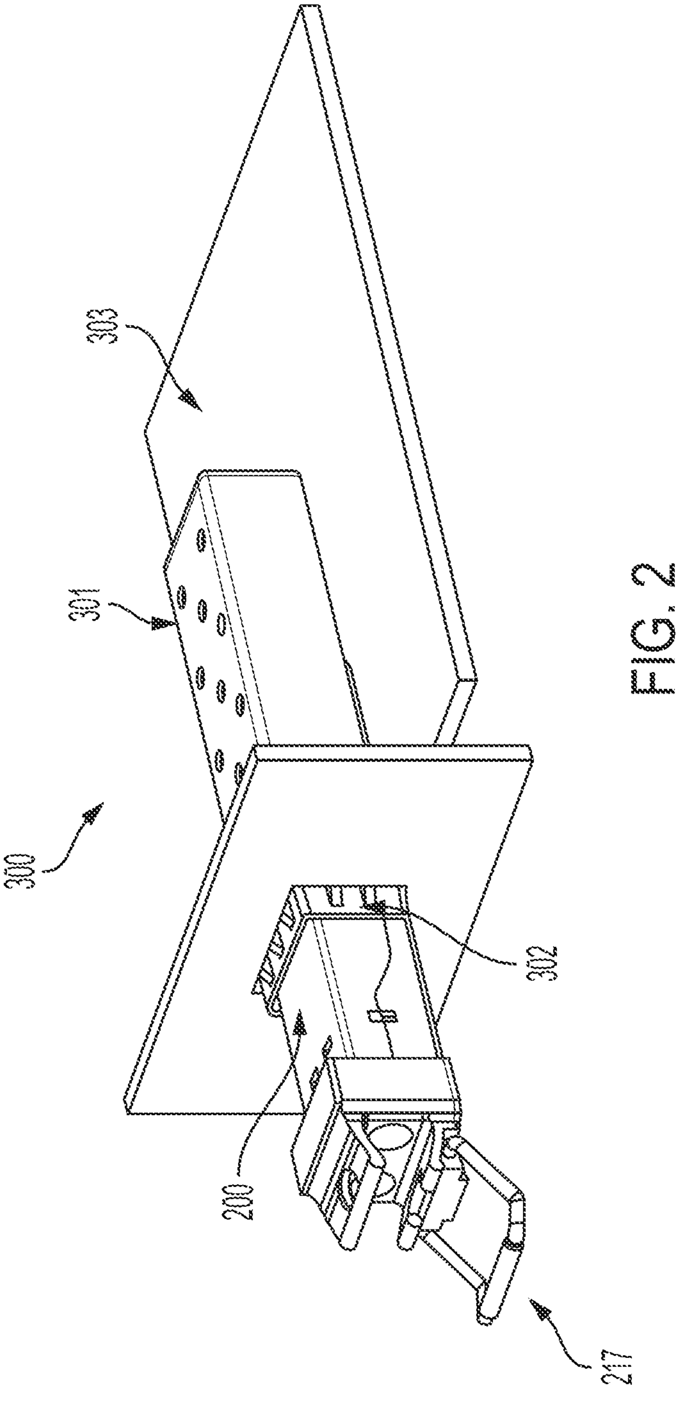
FIG. 2 is an isometric view of a portion of an electronic assembly, partially cut away, to reveal an input/output (I/O) connector within a cage.

FIG. 2 illustrates a known I/O connector arrangement, which does not support cabled connections to a midboard. In the embodiment illustrated in FIG. 2, a cage 301 is mounted to a printed circuit board 303 of an electronic assembly 300. A forward end 302 of cage 301 extends into an opening of a panel, which may be a wall of an enclosure containing circuit board 303. To make connections between components within electronic system 300 and external components, a transceiver 200 may be inserted into the channel formed by cage 301.

A transceiver 200 is shown partially inserted into the forward end 302 of cage 301. Transceiver 200 includes a bail 217, which may be grasped to insert and remove transceiver 200 from cage 301. Though not shown in FIG. 2, an end of transceiver 200, such as the end adjacent bail 217, may be configured to receive optical fibers, which may be connected to other electronic devices.

Transceiver 200 may include circuitry that converts optical signals on the fibers to electrical signals and vice versa.

Though not visible in FIG. 2, a receptacle connector may be mounted at the rear end of cage 301. That connector provides signal paths between transceiver 200 and traces within printed circuit board 303 such that electrical signals may be exchanged between the transceiver and components mounted to a printed circuit board 300.

Figure 3:
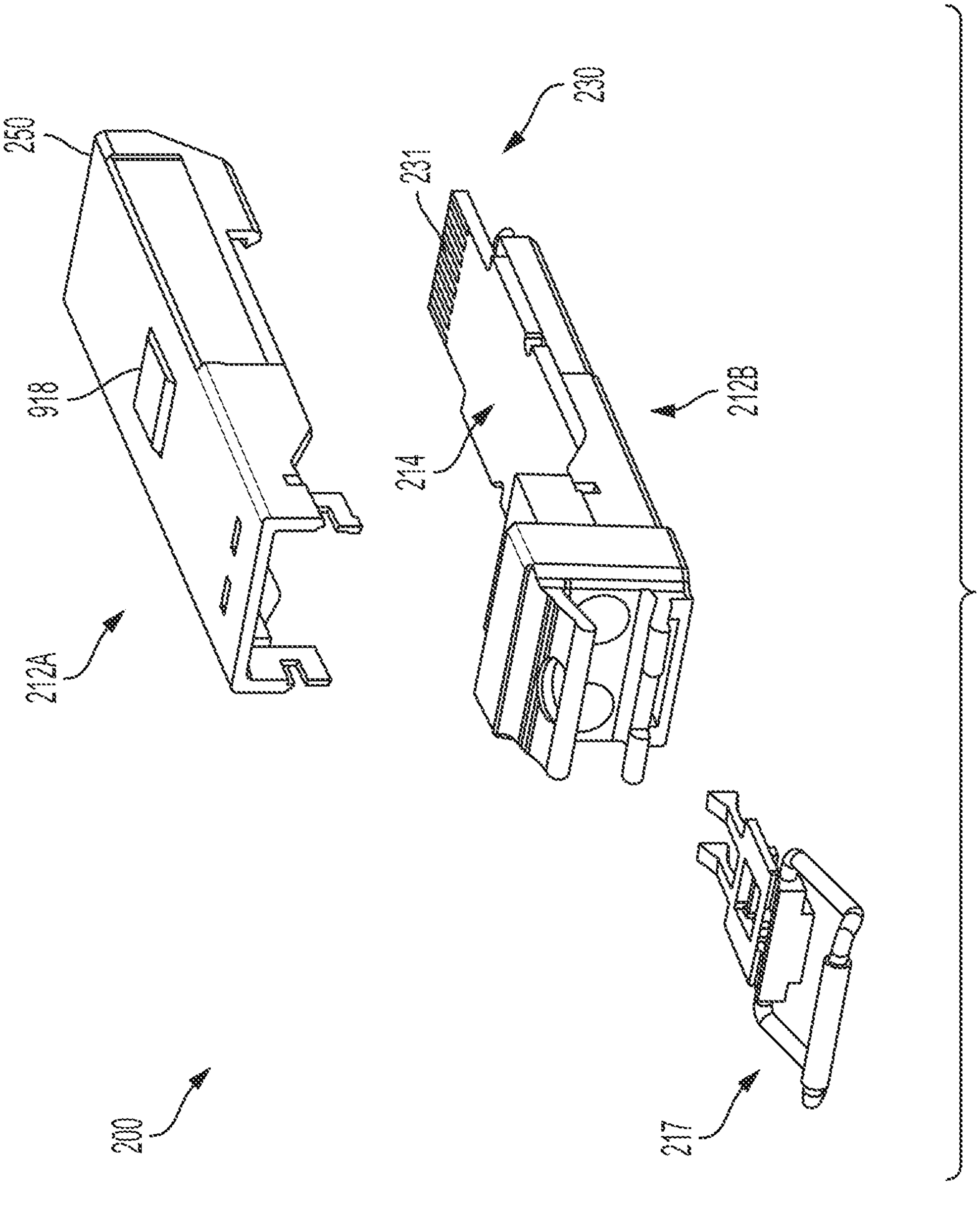
FIG. 3 is an exploded view of a transceiver configured for insertion into the cage of FIG. 2.

FIG. 3 shows an exploded view of transceiver 200, including upper housing portion 212A and lower housing portion 212B. Internal to transceiver 200, housed in lower housing portion 212B, is a printed circuit board 214, sometimes called a "paddle card". A mating end 230 of paddle card 214 contains conductive pads 231 disposed at a mating end 230 of the paddle card 214. The mating end 230 of the paddle card 214 is configured to be mated with a slot of a corresponding receptacle connector. The mating end 230 of paddle card 214 may be inserted into a receptacle connector and mating contacts of conductive elements within a connector may make contact to the conductive pads 231. FIG. 3 shows a row of conductive pads 231 on an upper surface of paddle card 214. A similar row of conductive pads may line the bottom side of paddle card 214. A transceiver with a paddle card in this configuration may mate with a receptacle connector that has a slot into which the mating end 230 of the paddle card 214 is inserted. The slot of the receptacle connector may be lined top and bottom with mating contacts of conductive elements.

Upper housing portion 212A is configured to mate with lower housing portion 212B and enclose at least a portion of the paddle card 214. The upper housing portion includes a forward end 250 and a projection 918. The forward end 250 may be configured to not contact a receptacle connector mating with the transceiver 200 or any tabs of a cage enclosing the receptacle connector such that the relative position of the plug and the receptacle connector is not established by interference of the transceiver 200 and the receptacle connector. Projection 918 may be configured to engage with a retention member of the cage, such as a tab folded from a wall of the cage at a 90 degree angle, when the plug is inserted into a channel of the cage to establish a position of the transceiver 200 relative to the receptacle connector.

Each of upper housing 212A and lower housing 212B may be formed of metal and may thus be configured to hold a close tolerance between the projection 918 and the conductive pads 231 of the mating end 230 of the paddle card 214.

FIG. 3 illustrates a paddle card for a single density connection, as a single row of pads on the paddle cards is shown. Some transceivers may employ a double density configuration in which two rows of pads are adjacent to a mating end of the paddle card. Techniques as described herein may be used to mount a receptacle connector, configured for making cabled connections to a midboard, to a printed circuit board and enclose the receptacle connector within a cage.

In various embodiments, various cage configurations may be used with a receptacle connector, configured for making cabled connections to a midboard. Various configurations may be used for holding the receptacle connector within a cage. The receptacle may be positioned with respect to a channel in the cage into which a transceiver or other plug is inserted. Accurately positioning the receptacle within the channel may improve the electrical performance of the connector system, as it can reduce the tolerance in the position of the receptacle connector and the plug when mated, which in turn may enable the connectors to include shorter wipe length, and therefore achieve higher frequency operation.

In some configurations, some of the conductive elements within the receptacle may have contact tails, such as pressfits or surface mount tails, that may be connected directly to the printed circuit board. The cage may be configured to receive the receptacle through a top of the cage, with cables extending out of the rear of the cage, for example.

For receptacle connectors configured to make low-speed and power connections to the printed circuit board through cables attached to the conductive elements within the receptacle, the conductive elements may not have contact tails. In such a configuration, the receptacle connectors may not have pressfits, surface mount tails or otherwise be configured to be mounted directly onto the printed circuit board. Such a receptacle also may be top-loaded. Alternatively, the receptacle may slide along a bottom wall of the channel and may be rear-loaded. Regardless of the direction of insertion, the cage and/or receptacle may have one or more retention members that position the receptacle connector within the channel of the cage.

Figure 4C:
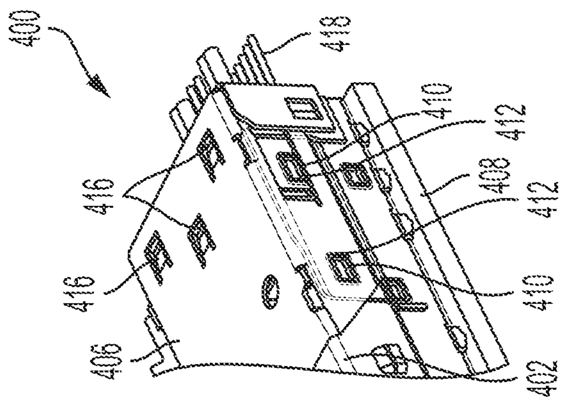
FIGS. 4A-4C are a series of figures illustrating steps in a manufacturing process for the electronic assembly in which a receptacle connector is mounted to a printed circuit board and enclosed by the cage.
Figure 4B:
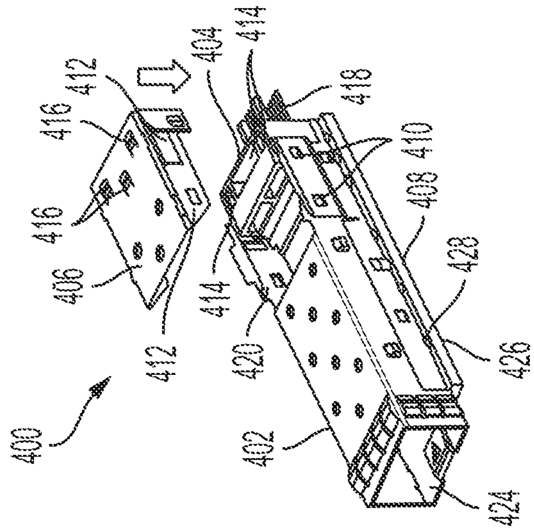
Figure 4A:
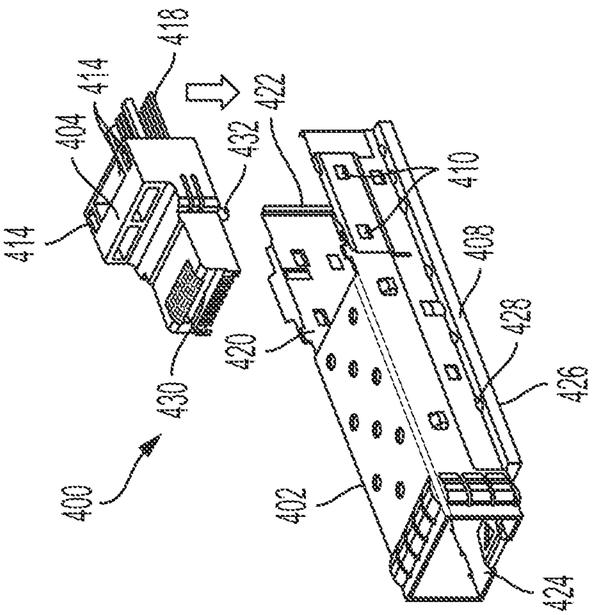

FIGS. 4A, 4B, and 4C illustrate a cage configuration suitable for top-loading a receptacle connector 404 and a method of assembling the electronic assembly 400 to include the receptacle connector 404 within the cage 402 and exposing cables 418 which may be routed to the midboard. Here, the cage 402 has a single channel, shaped for insertion of a plug, which may be a transceiver according to a known specification, such as a QSFP transceiver.

FIG. 4A shows that the cage 402 may first be mounted to the printed circuit board 408. The mounting may provide mechanical support for the cage 402 as well as connections to ground structures within the printed circuit board 408. Such connections may be made, for example, using pressfits extending from the bottom of the cage. However, other mounting techniques may be used to provide both mechanical support and electrical conductivity, including soldered connections. For example, according to some embodiments, cage 402 includes at least one mounting member 426, which may comprise A pressfit tail. When mounting cage 402 to the printed circuit board 408, each mounting member 426 may be inserted into a corresponding mounting member 428 of printed circuit board 408, for example, a hole, to make electrical and mechanical contact with the printed circuit board 408. Alternatively, the receptacle connector 404 may, in some embodiments, be inserted in the cage 402 before the cage 402 is mounted to the printed circuit board 408.

In this example, the receptacle connector 404 has conductive elements internal to it. Each of the conductive elements may have a mating contact portion, and the mating contact portions may line a slot 430 at the forward face of the receptacle connector 404. Some of those conductive elements may have contact tails configured for terminating cables 418, which may be routed through a rear opening 422 of the cage 404 to the board 408. Others of those conductive elements may have contact tails that extend at right angles from the mating contact portions and are configured with contact tails for mounting to the printed circuit board 408. In the illustrated example, the conductive elements that are electrically attached directly to the printed circuit board 408 may be pressfits such that the receptacle 404 may be mounted to the printed circuit board 408 by inserting it from the top of the cage 402, e.g., through a top opening 420 of the cage 402, and pressing it into the printed circuit board 408. The step of top loading the receptacle connector 404 into the cage is illustrated in FIG. 4A.

The cage 402 may be formed by folding one or more sheets of metal into the illustrated shape. In the illustrated embodiment, the body of the cage 402 has an upper portion and that has a top and two side walls of a channel, the channel having opening 424 configured to receive a plug. A separate piece, forming a bottom wall of the channel may be attached to the upper portion, creating an enclosure into which the receptacle 404 may be inserted. In embodiments in which the receptacle includes contact tails to be attached to the printed circuit, the bottom wall may have one or more openings such that the contact tails may pass through the bottom wall and contact the printed circuit board 408.

As can be seen in FIG. 4B with the receptacle connector 404 inserted in the cage 402, the contact tails configured for engaging the printed circuit board are connected to the printed circuit board 408. The cables 418, attached to other conductive elements within the receptacle connector 404, may extend through the rear wall of the cage, e.g., through rear opening 422. As shown, the rear wall may be partially or totally cut away, enabling the cables 418 to pass through the wall of the cage 402.

As also shown in FIG. 4B, a retention member 406 such as a top of the cage 402 may be pressed onto the cage 402, over the top opening 420 through which the receptacle connector 404 was inserted. As seen in FIG. 4C, when fully pressed onto the cage 404, the retention member 406, here a cover may latch to the body of the cage 402 in one or more locations. The latching may provide mechanical support to the structure. For example, the cage 402 includes latching members 410 configured to latch with the corresponding latching members 412 of the retention member 406. In the illustrative embodiment, latching members 410 comprise projections formed from cage 402 which may be inserted into latching members 412, which comprise openings formed in the retention member 406.

As can also be seen in FIGS. 4B and 4C, the top cage cover may be formed to provide additional mechanical support. Here, though the top cover is formed from a relatively thin sheet of metal, it has structural stability as a result of having been folded to have a top portion, a rear and two opposing sides. The portion of that sheet that forms the rear is folded around and latches to the sides.

Further, it can be seen that the cover is stamped to include spring fingers 416. These fingers press against the top of the receptacle connector 404, holding it against the printed circuit board 408. The spring fingers may counter forces that may be generated on the connector by the cables or forces acting on the cable, and prevent the receptacle connector 404 from disengaging if such forces occur.

Alternatively or additionally, the spring fingers 416 may engage with the receptacle connector 404 in other ways, such as by pressing into openings 414 in the housings of receptacle connector 404. In some embodiments, fingers such as spring fingers 416 cut from walls of the cage 402 may be bent beyond their elastic limit, and act as tabs engaging slots of the housing of receptacle connector 404, holding it in place.

Such configurations may transfer forces through the cage 402 that might otherwise have acted on the receptacle connector 404. Those forces, therefore, may be resisted by the attachment of the cage 402 to the printed circuit board 408 rather than relying solely on the attachment of the receptacle connector 404 to the printed circuit board 408. The attachment of the receptacle connector 404 to the printed circuit board 408 may be limited for electrical reasons. In comparison to a conventional connector of comparable size, for example, there are fewer connections, because many signals are routed through the cables 418, rather than into the board. In some embodiments, there may be no direct connections between the receptacle connector 404 and the printed circuit board 408.

Additionally, the conductive elements extending from the receptacle connector 404 for attachment to the printed circuit board 408 may be smaller than the structures of the cage 402 that can be attached to the printed circuit board 408. More robust connections are possible from the cage 402 because the structures extending from the receptacle connector 404 may be miniaturized for signal integrity reasons. Accordingly, projections from the cage 402 that are attached to the printed circuit board 408 may generate a force that is a multiple of the force generated by a conductive element extending from the receptacle connector 404. That multiple, for example, may be at least 1.5 or 2 or higher.

Other structures may alternatively or additionally be used for retaining the connector within the cage. A hub 432 can be seen, for example in FIG. 4A extending from a lower surface of the receptacle housing 404. That hub 432 may engage an opening (not illustrated in FIGS. 4A-C) in bottom of the cage 402, and/or an opening (not illustrated in FIGS. 4A-C) in printed circuit board 408, for additional retention force, particularly with respect to forces applied along directions parallel to the plane of the printed circuit board.

Inserting the receptacle connector 404 into the cage 402 from the top may be used, for example, in system configurations in which the cage 402 is mounted to a printed circuit board near other components. Electronic components may be mounted, for example, within 25 mm or less, such as 15 mm or less, or 10 mm or less from the rear of the cage. In a conventional manufacturing process, those electronic components would be mounted to the printed circuit board 408 as part of a solder reflow operation, which desirably would be performed before a receptacle connector 404 with attached cables 418 were installed in the cage. With a top-loading configuration as shown FIGS. 4A . . . 5C, the receptacle connector 404 may be inserted after other components are mounted to the printed circuit board 408. Alternatively or additionally, the top-loading configuration may be used with a receptacle connector 404 with conductive elements with contact tails for direct connection to the printed circuit board 408. The receptacle connector 404, for example, may be press fit to the printed circuit board 408 after the cage 402 is attached to the printed circuit board 408, or, if both the cage 402 and receptacle connector 408 are press fit to the printed circuit board 408, they might be attached to the board in the same operation.

Figure 5C:
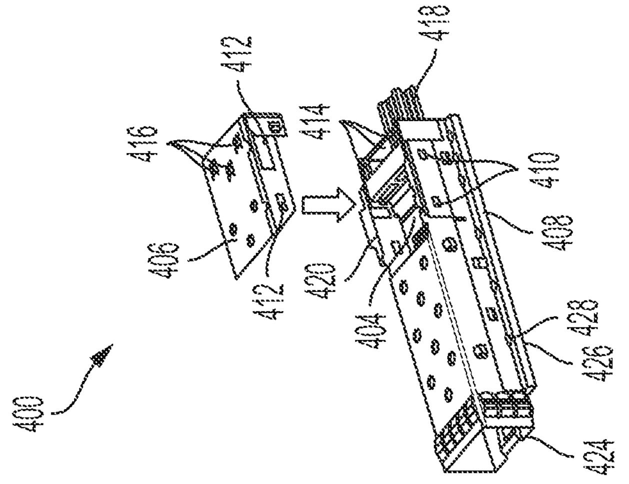
FIGS. 5A-5C are a series of figures illustrating steps in a manufacturing process for the electronic assembly in which a receptacle connector is mounted to a printed circuit board and enclosed by a cage.
Figure 5B:
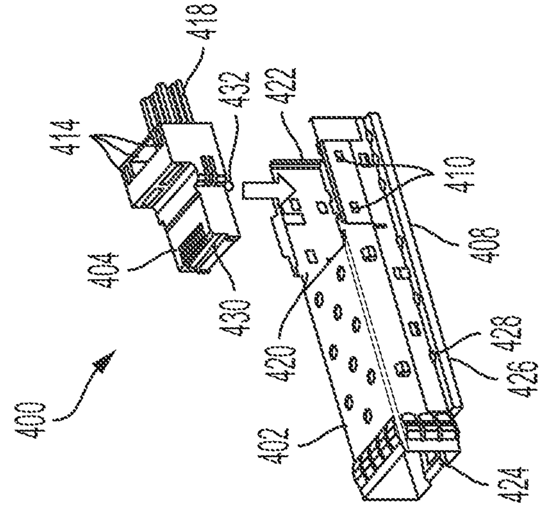
Figure 5A:
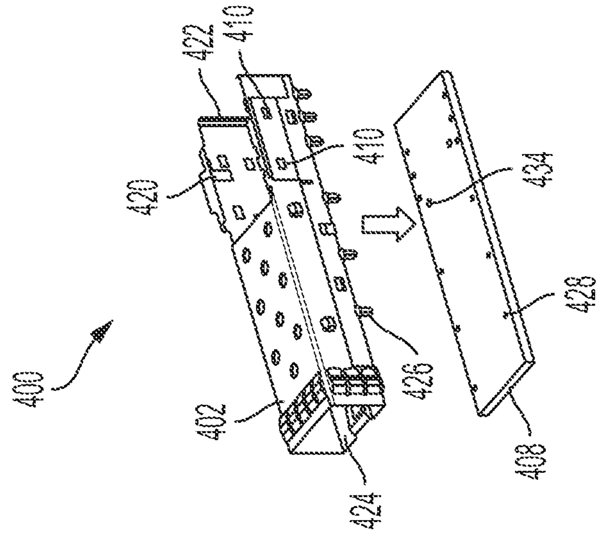

FIGS. 5A, 5B, and 5C illustrate a cage configuration suitable for mounting a receptacle connector 404, configured for making cabled connections to a midboard, to a printed circuit board 408 and for enclosing the receptacle connector 404 within a cage 402. FIGS. 5A, 5B, and 5C show a method of assembling the electronic assembly 400 to include the receptacle connector 404 or within the cage 402 and exposing cables 418 which may be routed to the midboard.

FIG. 5A shows a step of mounting the cage 402 the printed circuit board 408 using at least one mounting member 426. In the illustrative embodiment, the at least one mounting member 426 comprises pressfits extending downward from the cage 402 facing the printed circuit board 408. The pressfits may be formed from a same sheet of metal of the cage 402 and bent into or already aligned with the depicted configuration. The pressfits may extend along an axis that is normal to the printed circuit board 408. In the illustrative embodiment, the at least one mounting member 426 is inserted into a corresponding at least one mounting member 428 of the printed circuit board 408. The at least one mounting member 428 of the printed circuit board 408 may comprise at least one hole. Other mounting members may be included in the cage to provide both mechanical support and electrical conductivity, including soldered connections.

For example, instead of or in addition to pressfits, the posts may extend from the body of the cage 402. The posts may extend through solder paste on the printed circuit board 408 and may extend into openings of the printed circuit board 408. The printed circuit board may be heated in a reflow solder operation, mechanically and/or electrically connecting the body of cage 402 to printed circuit board 408. The reflow operation may be performed before the receptacle connector 404 is inserted into the cage 402, such that the heat of the reflow solder operation will not damage cables 418 connected to the receptacle connector 404.

FIG. 5B may illustrate an additional view of the configuration shown in FIG. 4A. FIG. 5C may illustrate an additional view of the configuration shown in FIG. 4B. In the assembly sequence shown in FIGS. 5A . . . 5C, the receptacle connector 404, terminating cables 418, is inserted after attachment of the body of cage 402 to the printed circuit board 408. The retention member 406, here a top cage cover is then secured to the body of cage 402, retaining the receptacle connector 404 in the channel of the cage 402.

FIG. 5B depicts a hub 432 extending from a lower surface of the receptacle housing 404. The hub 432 is configured to may engage an opening in bottom of the cage 402 (not illustrated in FIGS. 5A-C) and/or an opening 434 in printed circuit board 408 to provide additional retention of the plug 404.

In some embodiments, other cage configurations may be used for mounting a receptacle connector, configured for making cabled connections to a midboard, to a printed circuit board and to enclose the receptacle connector within a cage and may provide methods of assembling the electronic assembly to include the receptacle connector or within the cage and exposing cables which may be routed to the midboard. FIGS. 6A . . . 10B illustrate alternative techniques for positioning a receptacle connector within a channel of a cage. In each case, a cage body may be first electrically and/or mechanically attached to the printed circuit board, such as with pressfits or solder posts, as described above. The receptacle connector may then be inserted into the cage. In the various embodiments illustrated in FIGS. 6A . . . 10B, the receptacle connector is inserted from the rear of the cage and the receptacle does not have contact tails that are mounted to a printed circuit board. As a result, the bottom of the receptacle may be free of obstructions such that the receptacle connector may slide along a bottom of the channel. One or more retention members may be included on the cage and/or receptacle to hold the receptacle connector within the cage.

Figure 6B:
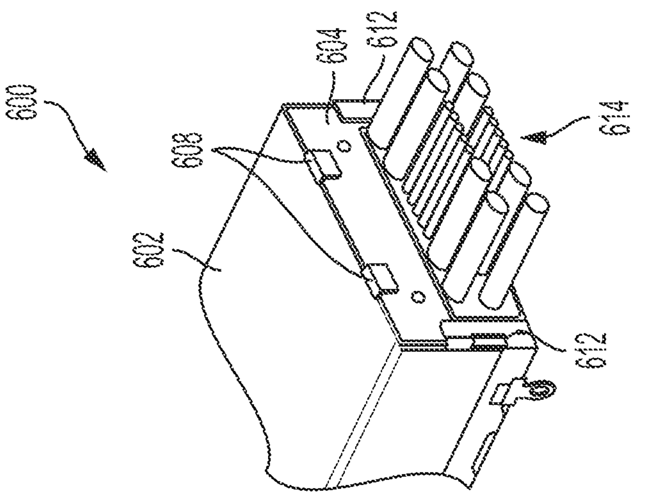
FIG. 6B is a rear perspective view of a rear portion of the electronic assembly of FIG. 6A in which the receptacle connector is retained in the cage, in part, by tabs of the cage.
Figure 6A:
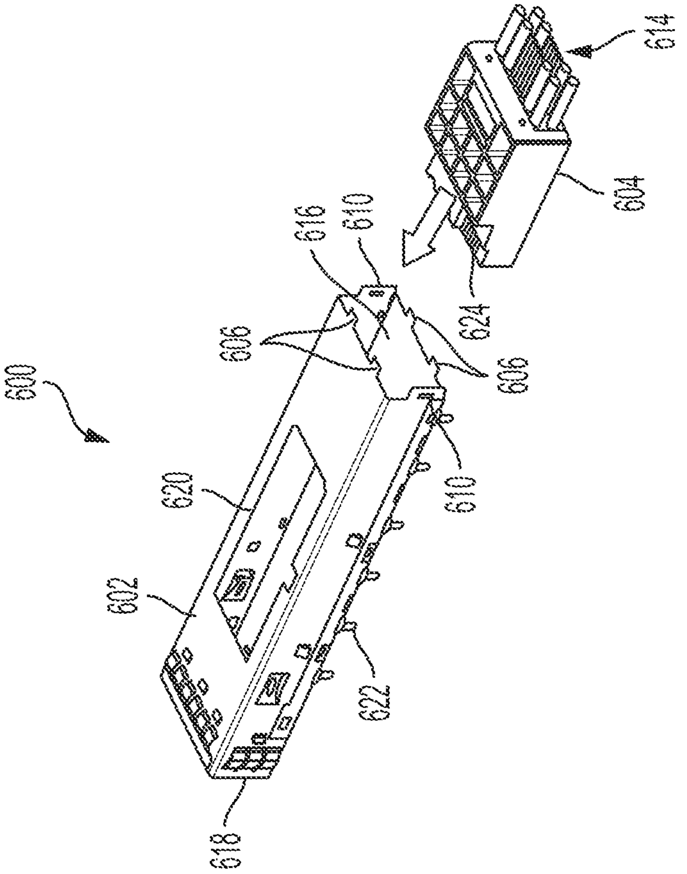
FIG. 6A is a rear perspective view of a step in a manufacturing process for the electronic assembly in which a receptacle connector is inserted in a channel of a cage.

For example, FIGS. 6A and 6B show one embodiment of an electronic assembly 600 having a cage configuration with a rear-loaded, receptacle connecter. Electronic assembly 600 includes a cage 602, having first retention members 606 and 610 and a receptacle connector 604 coupled to cables 614. Cage 602 here is shown with a single channel into which the receptacle, and a mating plug, may be inserted.

The cage 602 may be mounted to a printed circuit board. The cage 602 may therefore include at least one mounting member 622. The at least one mounting member 622 may comprise pressfits, solder posts or other structures for mounting the cage 602 to such a printed circuit board. Cage 602 may be mounted to a printed circuit board with or without the receptacle connector 604 installed. The cage 602 may include a top opening 620 configured such that a heat sink may extend through the opening 620 into the cage 602 to contact and/or cool a transceiver disposed in the cage 602.

The cage 602 includes various retention members, including first retention members 606 and 610. The retention members may alone, or in combination with other elements of the assembly, position the receptacle with respect to the cage. As a plug that mates with the receptacle may also be positioned by the cage, the retention members may reduce the tolerance stackups of the assembly, particularly with respect to the positioning of the plug and receptacle connector 604. In the illustrated embodiment, first retention members 606 and 610 are formed from a same piece of sheet metal as at least one portion of cage 602. Accordingly, as shown in FIG. 6A, the retention members may initially be arranged in-line and in-plane with walls of the cage 602. In the example of FIGS. 6A and 6B, the retention members are metal tabs. As shown in FIG. 6A, first retention members 606 extend from a top wall of cage 602. First retention members 610 extend from the side walls.

The retention members of the cage 602 are configured to at least partially retain the receptacle connector 604 in the cage 602. For example, receptacle connector 604 having slot 624 lined with mating contact portions and coupled to cables 614 may be inserted into the cage 602 at a rear end 616 of the cage 602. The rear end 616 of the cage may be opposite a front end 618 of the cage 602, where the front end 618 of the cage 602 is configured to accept at least one plug, which may be a transceiver, such as an optical transceiver. In the embodiment shown, the channel of the cage is open at front end 618 such that the plug may be inserted into the channel. The receptacle connector 604 may be inserted into the rear end 616 of the cage 602 along a direction that is parallel to an axis extending from the rear end 616 to the front end 618. The extending axis may be parallel to each of the side walls of the cage 602. In the illustrative embodiment, the receptacle connector 604 is devoid of pressfits and is not configured to be electrically coupled to a printed circuit board except through the cables 614.

When the receptacle connector 604 is inserted into the rear end 616 of the cage, the first retention members 606 and 610 may be bent to engage with the receptacle connector. For example, in FIG. 6B, the first retention members 606 have been bent into first engaged retention members 608, and retention members 610 have been bent into second engaged retention members 612. In the illustrative embodiment of FIGS. 6A and 6B, the retention members are metal tabs. In FIG. 6B, the metal tabs are bent inwards across the rear of the receptacle connector 604. In some embodiments, tabs may be bent at a 90 degree angle to retain the receptacle connector 604. Alternatively or additionally, some or all of the tabs may be bent at a greater than 90 degree angle to press on the receptacle connector 604, biasing it forward in the channel in the cage.

Figure 7C:
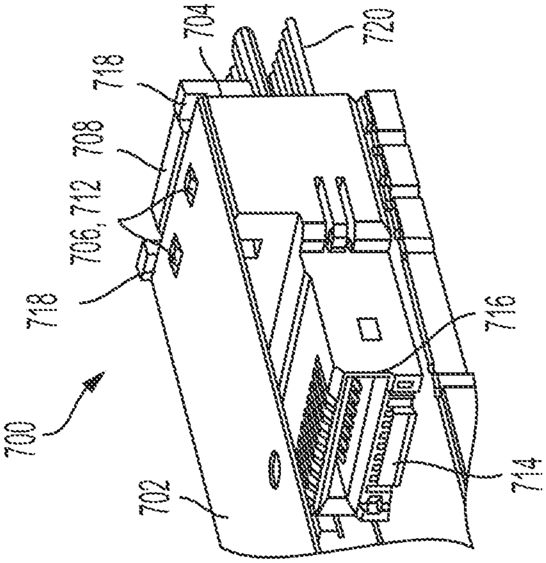
FIG. 7C is a cross-sectional front perspective view of the electronic assembly of FIG. 7A in which the receptacle connector is retained in the cage, in part, by a latching arm of the receptacle connector.
Figure 7B:
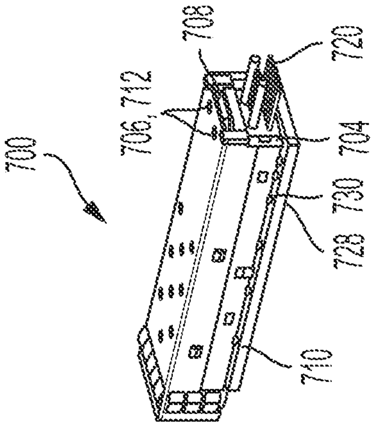
FIG. 7B is a rear perspective view of the electronic assembly of FIG. 7A in which the receptacle connector is retained in the cage, in part, by a latching arm of the receptacle connector.
Figure 7A:
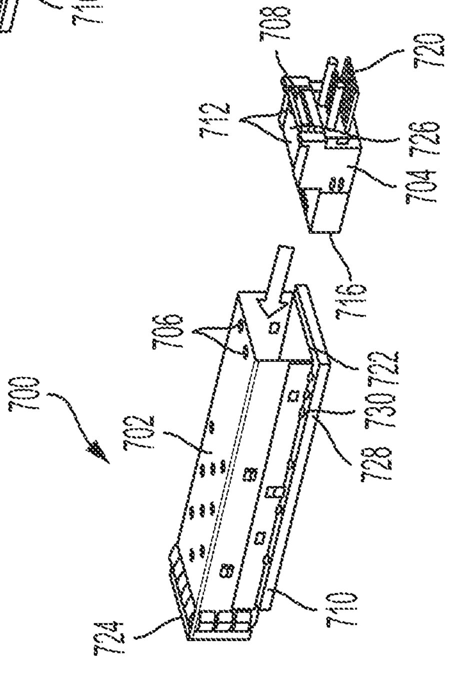
FIG. 7A is a rear perspective view of a step in a manufacturing process for the electronic assembly in which a receptacle connector is inserted in a channel of a cage.

FIG. 7A shows a step of assembling receptacle connector 704 with cage 702, cage 702 being mounted to printed circuit board 710. FIG. 7B shows the receptacle connector 704 assembled with the cage 702 and the printed circuit board 710. FIG. 7C shows a detail cutaway view of the receptacle connector 704 assembled with the cage 702 and the printed circuit board 710. FIGS. 7A, 7B, and 7C show another embodiment of an electronic assembly 700 having a cage configuration with a rear-loaded receptacle connector. Electronic assembly 700 includes a cage 702 mounted to substrate 710, such as a printed circuit board. The cage 702 is configured to accept a plug which may be a transceiver, such as an optical transceiver, at front end 724. The cage 702 may include at least one mounting member 728, such as a pressfit, configured to be mounted to a corresponding at least one mounting member 730 of the printed circuit board 710, such as a hole in the printed circuit board 710.

Cage 702 has first retention member 706 and second retention member 714 holding receptacle connector 704 within a channel of cage 702. First retention member 706 prevents receptacle connector 704 from moving more rearward than a predetermined location in the channel. Second retention member 714 prevents connector 704 from moving more forward than a predetermined location in the channel. In the illustrated embodiment, second retention member 714 is a tab, cut from the bottom wall of the channel, that partially extends into the channel. Additionally, stops 718 extending from a surface of a housing of receptacle connector 704 may retain motion of the receptacle connector within the channel beyond a predetermined location. As shown in FIG. 7C, stops 718 engage an edge of the rear of cage 702 when receptacle connector 702 is inserted into the predetermined position within the channel.

The first retention members 706 are latching features, engaging with a latching projection 712 on receptacle connector 704 once receptacle connector 704 has been inserted into the channel sufficiently far to reach that predetermined location.

Conductive elements within receptacle connector 704 terminate cables 720, which extend from the rear of cage 702. The receptacle connector 704 has a slot 716 lined with mating contact portions, configured to receive a mating portion of a plug. That plug may have pads sized and spaced according to a standard such as QSFP. The conductive elements may have mating contact portions lining upper and lower walls of slot 716, such that they may contact pads of the plug such that signals may pass through receptacle connector 704 between the plug and the cables on the conductive elements.

Electronic assembly 700 differs from electronic assembly 600 by the manner in which the receptacle connector 704 is retained in the cage 702. For example, some of the retention members of assembly 700 may form a latching mechanism. Latching projections 712 are on a spring arm 726, which in the illustrated embodiment is integrally molded with an insulative housing of receptacle connector 704. When receptacle connector 704 is inserted into cage 702 sufficiently far that latching projections 712 align with first retention members 706, latching projections 712 will be urged by the force in the spring arm 726 into the first retention members 706, blocking rearward motion of receptacle connector 704. To release receptacle connector 704 from the cage, the spring arm 726 may be depressed, towards the receptacle housing. Depressing the spring arm 726, releases latching projections 712 from the first retention members 706 such that the receptacle connector can be withdrawn from the rear of the cage. In the illustrated embodiment, actuator 708 is on the distal end of the spring arm 726 and is sized and positioned to enable a person to readily depress the spring arm 726 without the use of a tool.

Receptacle connector 704 is inserted into rear end 722 of cage 702 in a similar manner that receptacle connector 604 is inserted into rear end 616 of cage 602. When receptacle connector 704 is inserted into rear end 722 of cage 702, the first retention members 706 of the cage 702 engage the latching projections 712 of the receptacle connector 704. In the illustrative embodiment, the first retention members are openings through a rigid portion of the cage 702 and the latching projections 712 extend from a spring arm 726 of receptacle connector 704. As receptacle connector 704 is pushed into the channel of the cage, a wall of the cage will interfere with the latching projections 712. A forward surface of latching projections 712 may be tapered such that, as the latching projections press against an edge of cage 702, a camming force is generated, pushing the latching projections towards receptacle 704 such that the latching projections do not block movement of receptacle connector 704 within the channel. Once the latching projections are aligned with holes forming first retention members 706, the spring force on the spring arm 726 will force the protrusions into the openings. The rearward surfaces of latching projections, are not tapered and instead engage the edge of the cage bounding the holes forming first retention members 706. Accordingly, the engagement of the first retention members 706 and the latching projections 712 may prevent the receptacle connector from being withdrawn from the rear end 722.

The second retention member 714 and the stops 718 may be configured retain the receptacle connector 704 at least in part by positioning the receptacle connector 704 relative to the cage 702. As shown in FIG. 7C, second retention member 714 may be a metal tab of a same sheet of metal as at least one portion of the cage 702, bent to a 90 degree angle relative to that portion of the cage, in this case the bottom wall of cage 702. When the receptacle connector 704 is inserted into the cage 702, a front surface of the receptacle connector engages the bent metal tab, which provides a position of the receptacle connector without obstructing slot 716 of the receptacle connector 704.

As shown in FIG. 7C, the stops 718 may also provide a position of the receptacle connector 704 relative to cage 702. As shown in FIG. 7C, stops 718 may be protrusions from the housing of the receptacle connector, extending in the vertical direction past the upper wall of the cage 702. Thus, when the receptacle connector 704 is inserted into the cage 702, a front surface of the protrusion engages the upper wall of the cage, which also positions the receptacle connector instead of or in addition to second retention member 714.

The cage 702 may be pressfit onto board with or without plug installed. Cage 702 does not require a top clip or open top as illustrated in the embodiment of FIGS. 4A-4C and thus has fewer pieces and increased robustness. The receptacle connector configuration in assembly 700 may allow for one-handed installation/removal by a user with no tool required. Receptacle connector may be installed/removed before or after cage 702 is attached to a printed circuit board. Cage 702 may be used with a receptacle connector, such as receptacle connector 704, in which the conductive elements do not have contact tails for making direct connection to a printed circuit board to which the connector assembly might be mounted such that a lower surface of the receptacle connector housing may slide along a bottom wall of a channel of the cage when inserted from the rear.

Figure 8B:
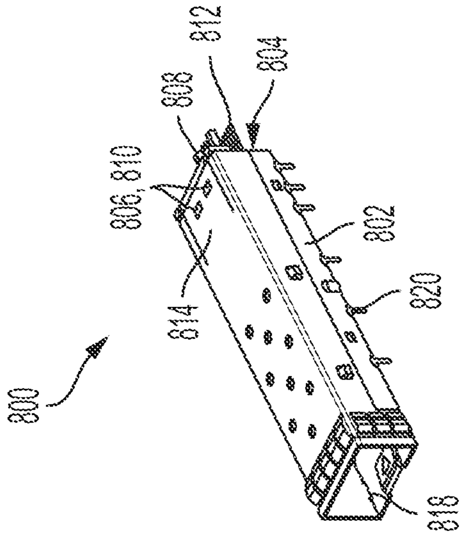
FIG. 8B is a side perspective view of the electronic assembly of FIG. 8A, in which the receptacle connector is retained in the cage, in part, by a latching arm of the cage.
Figure 8A:
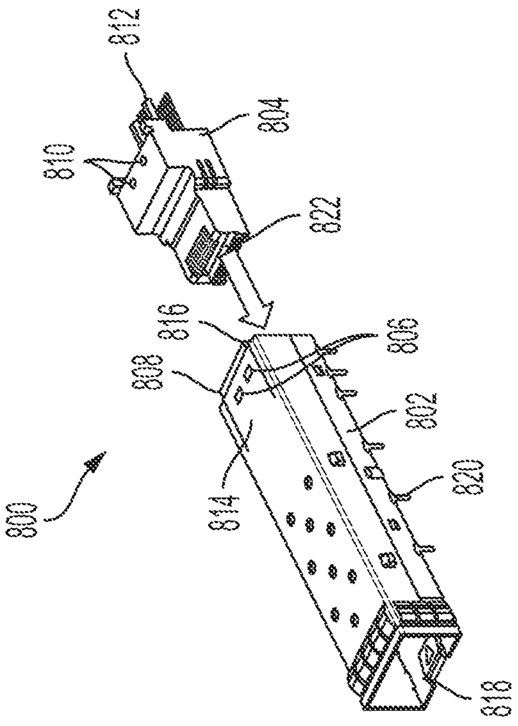
FIG. 8A is a side perspective view of a step in a manufacturing process for the electronic assembly in which a receptacle connector is inserted in a channel of a cage.

FIG. 8A shows a step of assembling receptacle connector 804 with cage 802. FIG. 8B shows the receptacle connector 804 assembled with the cage 802. FIGS. 8A and 8B show another embodiment of an electronic assembly 800 having a cage configuration with a rear-loaded receptacle connector. Electronic assembly 800 includes a cage 802 having an front end 818 configured to accept a plug which may be a transceiver, such as an optical transceiver, and having first retention member 806 and actuator 808, as well as a receptacle connector 804 coupled to cables 812. Cage 802 may include a tab or other feature serving as a second retention member, similar to second retention member 714, which is not visible in FIGS. 8A and 8B. Cage 802 may include at least one mounting member 820, such as a pressfit, configured to be mounted to a corresponding at least one mounting member of a printed circuit board, such as a hole in a printed circuit board. Receptacle connector 804 has a slot 822 lined with mating contact portions, latching projections 810, and also stops (not numbered), similar to stops 718.

Assembly 800 differs from assembly 700 in the manner of the latching mechanism is implemented. Similarly to connector assembly 700, latching projections on the receptacle connector housing may engage openings in the cage to latch the receptacle connector in a channel of the cage. As illustrated in FIGS. 8A and 8B, first retention members 806 are formed in a flexible portion of cage 802. In the illustrated embodiment, a spring finger 814 is cut into the top wall of cage 802. When receptacle connector 804 is pressed into the channel of cage 802, e.g., through rear end 816 of cage 802, a tapered forward side of the latching projections 810 will press against and lift the spring finger 814 such that the spring finger 814 does not interfere with latching projections 810. When the latching projections align with the holes serving as the first retention members 806, the camming force lifting the spring finger 814 away from receptacle connector 804 will be removed and the spring finger 814 will spring back, engaging latching projections 810 in the holes.

In the embodiment of FIGS. 8A and 8B, actuator 808 is formed at an end of the spring finger 814. Actuator 808 may formed as a metal tab of a same sheet of metal as at least one portion of the cage. When actuator 808 is pushed or pulled away from the receptacle connector 804, the first retention members 806 and the latching projections 810 may disengage from each other, allowing the receptacle connector 804 to be removed from the cage 802. Actuator 808 may be positioned and shaped such that a user may move it with a finger, without the need of a tool.

Figure 9B:
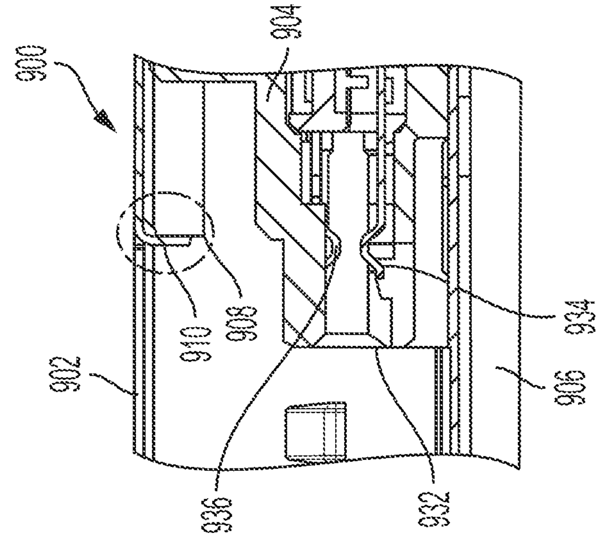
FIG. 9B is a cross section of a portion of the electronic assembly of FIG. 9A showing the receptacle connector engaged with a retention member of the cage.
Figure 9A:
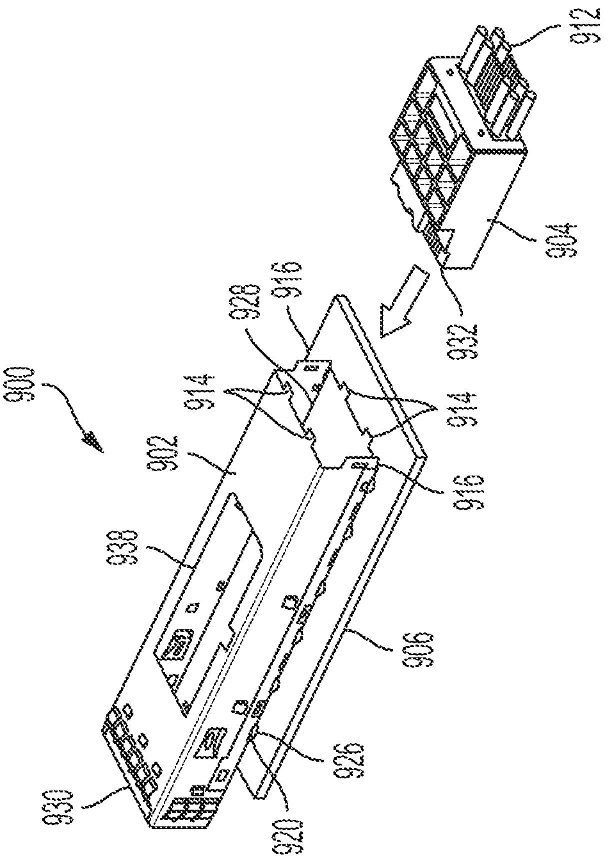
FIG. 9A is a rear perspective view of a step in a manufacturing process for the electronic assembly in which a receptacle connector is inserted in a channel of a cage.

FIG. 9A shows a step of assembling receptacle connector 904 with cage 902, cage 902 being mounted to substrate 906. FIG. 9B shows a detail cutaway view of the receptacle connector 904 assembled with the cage 902 and the substrate 910. FIGS. 9A and 9B show another embodiment of an electronic assembly 900 having a cage configuration with a rear-loaded receptacle connector. Here, receptacle connector 904 is coupled to cables 912. Receptacle connector 904 has slot 932, lined with lower contact mating portions 934 and upper contact mating portions 936 and configured to receive a portion of a plug, such as a paddle card in the plug.

Electronic assembly 900 includes a cage 902 mounted to substrate 906. The cage 902 is here shown having tabs 914 and 916. As in the embodiment of FIGS. 6A and 6B, once the receptacle connector is inserted, at rear end 928 of cage 902, into a channel of the cage 902, tabs 914 and 916 may be bent to serve as first retention members, preventing withdrawal of the receptacle connector from the rear of the channel.

According to some embodiments, the cage 902 is configured to accept a plug such as a transceiver at front end 930. The cage 902 may include at least one mounting member 920, such as a pressfit, configured to be mounted to a corresponding at least one mounting member 926 of the printed circuit board 906, such as a hole in the printed circuit board 906. The cage 902 may include a top opening 938 configured such that a heat sink may extend through the opening 938 into the cage 902 to contact and/or cool a transceiver disposed in the cage 902.

In the embodiment of FIGS. 9A and 9B, one or more second retention members may prevent the receptacle connector from being pushed into the channel beyond a predetermined position. Here, second retention member 910 is a tab bent from the same sheet of metal forming the top wall of the channel of cage 902. As can be seen in FIG. 9B, surface 908 of the housing of receptacle connector 904 presses against second retention member 910, positioning receptacle connector 904 with respect to second retention member 910.

In the embodiment illustrated in FIG. 9B, surface 908 is offset, toward the rear of the assembly, from the mating face of the receptacle connector containing slot 932. A tab, similar to tab second retention member 714, may alternatively or additionally be formed in the bottom wall of the channel of the cage. Positioning a tab such as second retention member 910 to engage a surface set back from the forward-most surface of the receptacle connector may also serve a polarizing function. If receptacle connector 904 were inserted upside down, the forward-most surface of receptacle 904 would butt against second retention member 910 before the receptacle connector is fully inserted into the channel. Because of the difficulty inserting receptacle 904, a user can readily observe that the receptacle connector is inserted improperly.

Figure 10B:
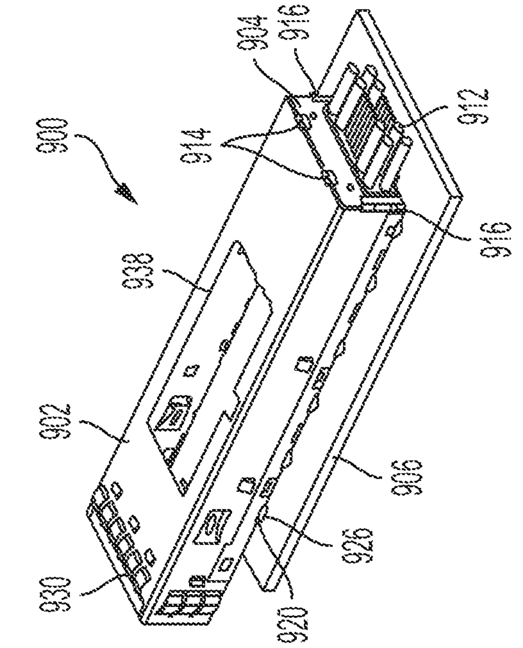
FIGS. 10A and 10B are a series of figures illustrating additional steps in the manufacturing process for the electronic assembly illustrated by FIGS. 9A and 9B.
Figure 10A:
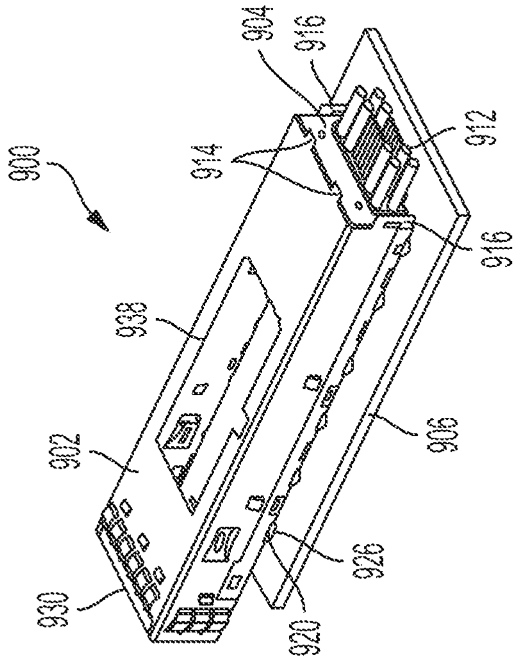
Figure 11A:
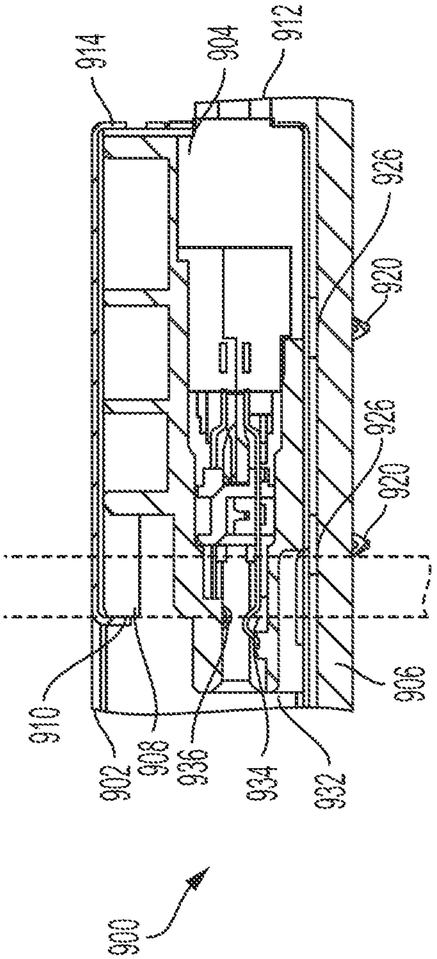
FIG. 11A is a cross section of an electronic assembly with retention members positioning a receptacle connector within a channel of a cage.
Figure 11B:
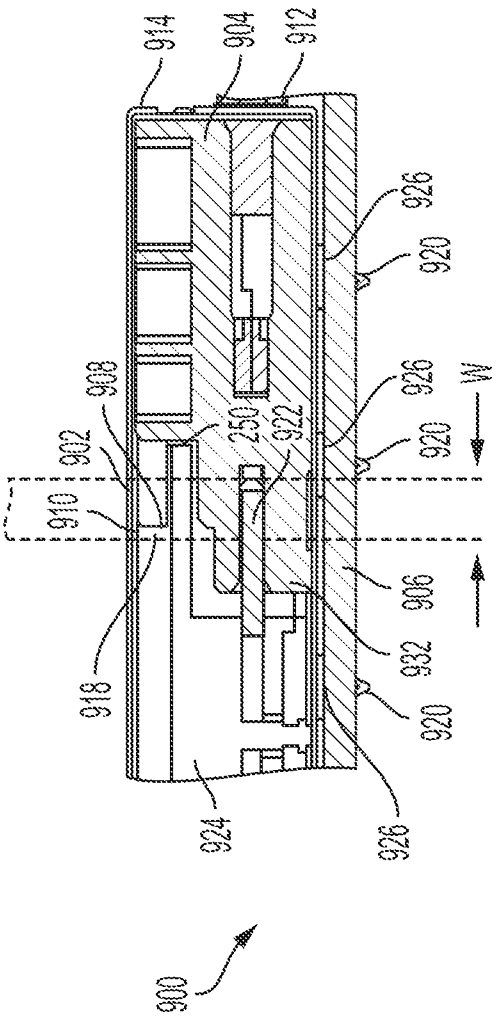
FIG. 11B is a cross section of the electronic assembly of FIG. 11A with a plug inserted in the channel to an insertion depth established by a retention members positioning a receptacle connector within the channel.

FIG. 10A shows receptacle connector 904 with cage 902 where retention members of cage 902 are not bent into place. FIG. 10B shows receptacle connector 904 with cage 902 where retention members of cage 902 are bent into place. FIGS. 10A and 10B show additional steps of assembling the electronic assembly 900. As discussed with respect to assembly 600 illustrated in FIGS. 6A and 6B, tabs 914 and 916 may be bent to engage receptacle connector 904 and retain it in cage 902. In the case of metal tab retention members, after plug is inserted into rear of cage as illustrated in FIG. 10A, the metal cage tabs at the top, sides, and bottom of the cage may be bent to lock the receptacle connector in place, as shown in FIG. 10B FIG. 11A shows a detail cutaway view receptacle connector 904 in cage 902. FIG. 11B shows a detail cutaway view of receptacle connector 904 in cage 902 where receptacle connector 904 is engaged with a transceiver 924. FIGS. 11A and 11B illustrate a manner in which retention features as described herein may increase the operating frequency range of a connector assembly. The designs as described herein may enable reduction in the length of stubs formed at the mating interface. In a connector, such as is designed to mate with a plug with a paddle card according to the QSFP standard, mating contacts of the conductive elements in the receptacle connector press against pads in a plug, such as on a paddle card 214 as shown in FIG. 3. Paddle card 922 is shown, for example, inserted in slot 932 in FIG. 11B.

A stub will be created as a result of such mating, but the length of the stub, and therefore its effect on the frequency range of the connector, may depend on the construction of the connector, including design tolerances. A stub results because, for reliable mating, the mating contacts of the receptacle may slide over the surface of the pads of the plug as the plug is inserted into the receptacle. The distance over which the mating contacts slide over the pad is sometimes called the wipe length. In the mated configuration, the pad will extend beyond the contact point where the mating contact of the receptacle contacts the surface of the pads by the wipe length. FIG. 11B, illustrates a paddle card inserted into slot 932 to an insertion depth giving rise to a wipe length W.

The end of the contact pad is electrically a stub with the wipe length. Decreasing the wipe length, therefore, decreases the stub length such that adverse electrical effects associate with the stub occur at higher frequencies. However, the wipe length of a connector cannot be made arbitrarily small without impacting other aspects of connector operation. First, a minimum wipe length is desired because the wiping of the contact surfaces removes contaminants from the contact surfaces, leading to a better electrical contact. Connectors may be designed such that when the plug is inserted into the receptacle, at least this minimum wipe is achieved.

Moreover, variations in the positioning of the mating contacts of the receptacle with respect to the pads must be considered. A variation in position may be described as a tolerance. In a connector system in which there may be multiple sources of variation, there may be a "tolerance stackup", representing the combination of possible variation in all of the components that might influence the relative position of the mating contacts of the receptacle with respect to the pads. For example, there may be variation of the position of the pads with respect to the edge of the paddle card, there may be variations of the position of the paddle card with respect to the plug housing, and variations of the positions of the plug housing with respect to the receptacle housing, an variations of the position of the mating contacts of the receptacle with respect to the receptacle housing. All of these variations may contribute to the tolerance stackup.

Regardless of the sources of variation contributing to the tolerance stackup, the connector may be designed such that, if the worst case misalignment of the mating contacts of the receptacle with respect to the pads occurs, an electrical connection will still result. If the tolerance stackup, for example, is X, and a desired wipe length is Y (which might be expressed as a nominal wipe length), the connector may be designed to provide a wipe length of X+Y. In this way, if a first worst case situation in which the positioning of the mating contacts of the receptacle with respect to the pads is off by a distance X in a direction that shortens the wipe length, the resulting wipe will still be Y, such that reliable mating may still occur. On the other hand, a second worst case situation in which the positioning of the mating contacts of the receptacle with respect to the pads is off by a distance X in a direction that increases the wipe length, the resulting wipe will Y+2X, such that reliable mating may still, but a relatively long stub of length Y+2X will result, decreasing the operating frequency of the connectors.

Figure 17A:
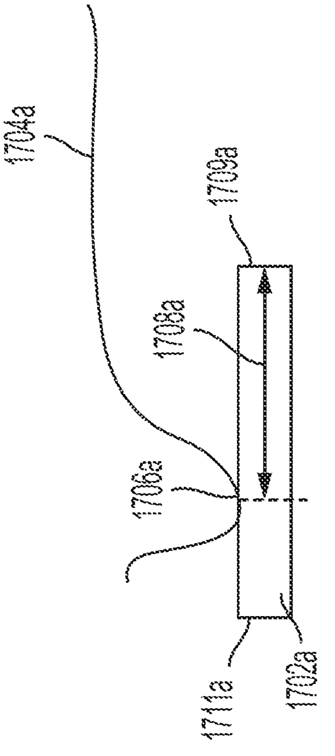
FIGS. 17A and 17B are side views of mating contact portions of receptacle connectors engaged with contact pads of plugs.

FIG. 17A shows a side view of a mating contact portion 1704*a* engaged with a contact pad 1702*a*. In some embodiments, mating contact portion 1704*a* may be a component of a receptacle connector similar to other receptacle connectors described herein. In some embodiments, contact pad 1702*a* may be a component of a plug similar to other plugs described herein. Contact mating portion 1704*a* mates with contact pad 1702*a* at contact point 1706*a*, forming a stub having stub length 1708*a*.

Figure 17B:
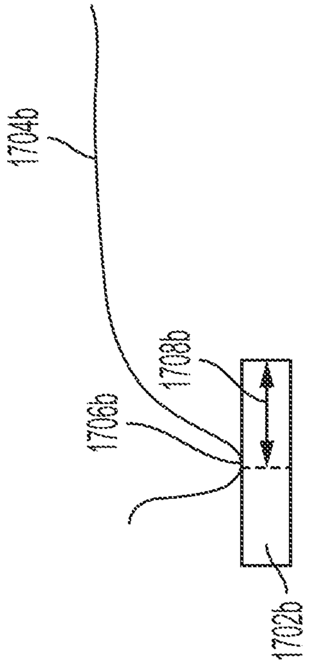

FIG. 17B shows a side view of a mating contact portion 1704*b* engaged with a contact pad 1702*b*. In some embodiments, mating contact portion 1704*b* may be a component of a receptacle connector similar to other receptacle connectors described herein. In some embodiments, contact pad 1702*b* may be a component of a plug similar to other plugs described herein. Contact mating portion 1704*b* mates with contact pad 1702*b* at contact point 1706*b*, forming a stub having stub length 1708*b*. Stub length 1708*b* is shorter than sub length 1708*a*. A reduced stub length 1708*b* may be achieved via reducing overall tolerance stackup using any of the techniques described herein.

Figure 17C:
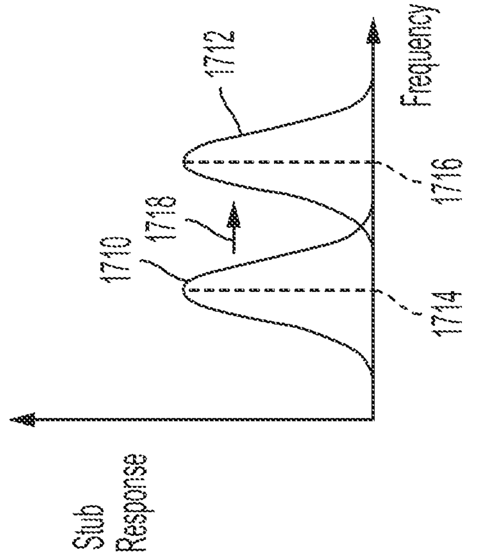
FIG. 17C shows an illustrative plot of stub response versus frequency for the mating contact portions of receptacle connectors engaged with the contact pads of plugs of FIGS. 17A and 17B.

FIG. 17C shows an illustrative plot of stub response versus frequency for the mating contact portion 1704*a* engaged with contact pad 1702*a* in FIG. 17A and contact mating portion 1704*b* engaged with contact pad 1704*b* in FIG. 17B. The horizontal axis shows frequency of signals transmitted through the contact mating portions and contact pads. The vertical axis shows the response of the stubs formed by the location of contact points 1706*a* and 1706*b* that results from the frequency of the signals transmitted through the contact mating portions and contact pads, at each frequency. The stub response may represent, for example, resonant frequencies arising in response to reflections in the stub. As signals propagate along a pad (for example from left to right in FIGS. 17A), a portion of the signal couples to the contact mating portion and a portion of the signal couples to the stub. The energy that couples to the stub is eventually reflected back at forward edge 1709*a*. The reflected signal can further reflect at rear edge 1711*a* (and/or at contact point 1706*a*), thus giving rise to a resonator.

Stub length 1708*a* has a response illustrated by curve 1710. Curve 1710 has a peak at frequency 1714 and tends to zero on either side of frequency 1714. Stub length 1708*b* has a response illustrated by curve 1712. Curve 1712 has a peak at frequency 1716 and tends to zero on either side of frequency 1716. The peak at frequency 1716 occurs at a higher frequency than the peak at frequency 1714. By reducing stub length, such as be reducing stub length 1708*a* to stub length 1708*b*, using the techniques described herein, a frequency shift 1718 to higher frequencies may be achieved. The frequency shift 1718 increases the operating frequency of signals that may be transmitted through contact mating portion 1704*b* and contact pad 1702*b* without the adverse electrical effects associated with stubs that occur at higher frequencies.

FIGS. 11A and 11B illustrate a technique for reducing stub length and therefore increasing the frequency range of a connector. As shown, both the receptacle connector and plug connector are positioned by the same feature or features on the cage. In the illustrated example, both the receptacle connector and plug, when mated, are positioned by second retention member 910. As described above, pressing surface 908 against one surface of second retention member 910 positions the receptacle in the channel. Pressing a surface of the plug against the opposite surface of second retention member 910 positions the plug.

A forward edge 250 of the transceiver 200 (FIG. 3) of the plug housing may fit within a recess of the receptacle housing without contact such that the position of the plug with respect to the receptacle is not established by interference of the plug housing and the receptacle housing. Rather, a feature on plug housing, such as projection 918 (FIG. 3) may be positioned to engage with second retention member 910. As the positions of the plug and receptacle are determined by the same feature on the cage, the relative position of the plug and receptacle may have smaller variation than in a convention connector design.

Positioning both the plug and receptacle connector with the same feature on cage 902 results in a shorter tolerance loop, and therefore less tolerance stackup. The tolerance stackup avoids and is not dependent on any tolerances of the mounting printed circuit board, and any eye of the needles and location posts or holes. The retention configuration of assembly 900 can provide a smaller maximum wipe range compared with conventional connector assemblies. For example, SFF standards, such as those used for QSFP connectors, may specify a maximum wipe of about 1.65 mm. However, by reducing tolerance in positioning the plug and receptacle relative to the same feature on the cage, the connector may be designed for a maximum wipe of 1.34 mm, for example. The resulting stub may be about 0.31 mm shorter than a connector of conventional design, enabling the connector to operate at higher frequencies. The operating frequency, for example, may be extended to above 50 Gbps, and may be 56 Gbps or 112 Gbps. The signals may be encoded as PAM-4 signals in some embodiments. A connector with such an operating frequency range, for example, may attenuate frequencies of up to 10, 25, 40 or 56 GHz, for example by a maximum of 3 dB.

Accordingly, a receptacle connector may have mating contact portions that are shorter than in a conventional connector, because a shorter wipe length is desired. When a plug, made according to an SFF standard is inserted into such a receptacle connector, the contact points will be closer to the forward edge of the pads than when the same plug is mated with a receptacle of conventional design and will have a nominal wipe length that is less than half the length of the pad. The nominal wipe length may be, for example, between 20 and 40% of the length of the pad, for example, or less, such as between 20 and 35% of the length of the pad.

FIGS. 11A and 11B show additional views of the assembly 900. FIGS. 11A and 11B show the cage 902 mounted to the printed circuit board 906 by mounting members 920. In FIG. 11A, the receptacle connector 904 is shown positioned between the first retention members 914 and the second retention member 910. The receptacle connector 904 is shown locked in place, biased against the back side of the second retention member 910, which here serves as module stop, such that receptacle connector 904 is held against the module stop by the first retention members 914, which in this embodiments is bent tabs.

FIG. 11B shows the assembly 900 as in FIG. 11A with a transceiver 924 mated with the receptacle connector 904. The transceiver 924 includes a transceiver projection 918 and a "paddle card" printed circuit board 922, which may be constructed from similar materials and according to similar techniques as paddle card 214 illustrated in FIG. 3.

The transceiver projection 918 is positioned engaged with a front surface of the second retention member 910 of the cage 902. This arrangement allows for precise positioning of the transceiver 924 relative to the receptacle connector 904, as each is engaged with the same second retention member 910.

When the transceiver projection 918 is engaged with the second retention member 910, the paddle card 922 is mated with the slot 932 of the receptacle connector 904 at a reduced tolerance relative to assemblies in which this arrangement of the transceiver projection 918, second retention member 910, and surface 908 is not present.

Figure 12A:
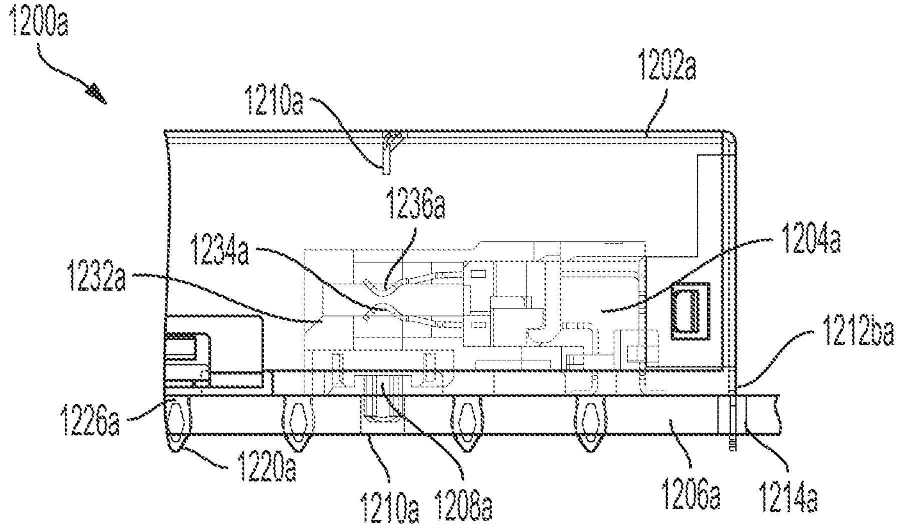
FIG. 12A is a side view of an electronic assembly with a side wall of a cage shown partially transparent to reveal a receptacle connector with surface mount contact tails positioned within the cage so as to reduce tolerance stackup.
Figure 12B:
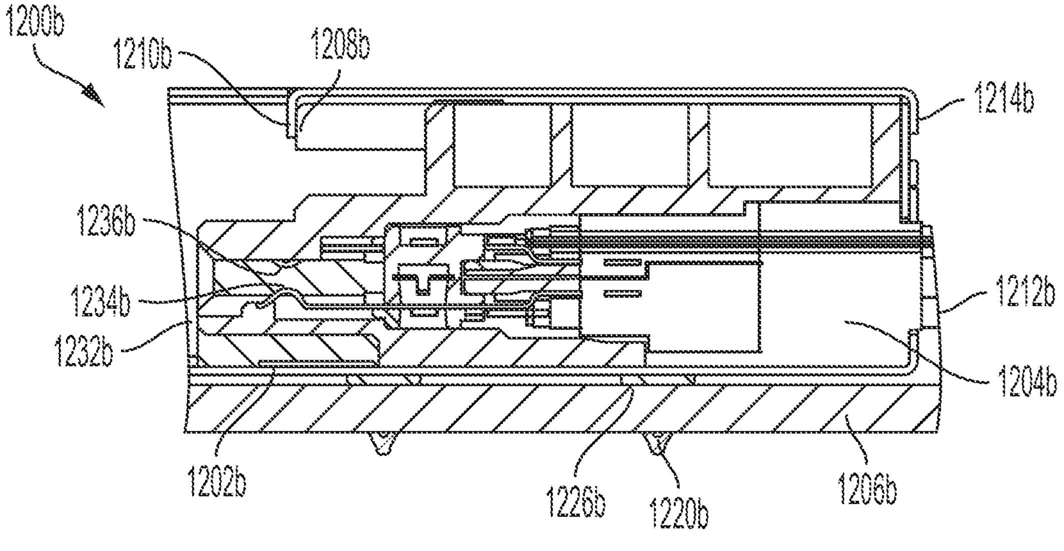
FIG. 12B is a cross section of an electronic assembly with a receptacle connector, without contact tails, positioned within the cage so as to reduce tolerance stackup.

FIGS. 12A and 12B illustrate various embodiments of tolerances of assemblies such as assembly 900 when the various retention members described above are or are not present.

FIG. 12A represents a QSFP surface mount (SMT) arrangement where the cage and receptacle connector are positioned separately with respect to the PCB. FIG. 12A shows an electronic assembly 1200*a* comprising a cage 1202*a*, a receptacle connector 1204*a*, and a printed circuit board 1206*a*. In FIG. 12A, the cage 1202*a* is illustrated as partially translucent to illustrate the exterior and the interior of the cage 1202*a*.

Cage 1202*a* is mounted to printed circuit board 1206*a* by at least one side mounting member 1220*a* of the cage 1202*a*, which may comprise a pressfit, engaged with at least one side mounting member 1226*a* of the printed circuit board 1206*a*, which may comprise a hole. Cage 1202*a* may be further mounted to printed circuit board 1206*a* by at least one rear mounting member 1212*a* of the cage 1202*a*, which may comprise a pressfit, engaged with at least one rear mounting member 1214*a* of the printed circuit board 1206*a*, which may comprise a hole. In this manner, the position of cage 1202*a* is established relative to the printed circuit board 1206*a*.

Cage 1202*a* includes a module stop 1210*a* configured to position a plug inserted into the cage 1202*a*, such as by engaging a surface of the plug with a surface of the module stop 1210*a*. In this manner, the position of a transceiver is established relative to the cage 1202*a*.

In the illustrative embodiment of FIG. 12A, the plug 1204*a* includes a slot 1232*a* lined with lower contact mating portions 1234*a* and upper contact mating portions 1236*a*. The plug 1204*a* may be mounted to printed circuit board 1206*a* by at least one mounting member 1208*a* of the plug 1204*a*, which may comprise a hub, engaged with at least one mounting member 1210*a* of the printed circuit board 1206*a*, which may comprise a hole. In this manner, the position of the receptacle connector 1204*a* is established relative to the printed circuit board 1206*a*.

Accordingly, the stackup of tolerances involved in the eventual mating of the transceiver with the receptacle connector 1204*a* are as follows. For the cage 1202*a*: the tolerance between module stop 1210*a* and cage mounting members 1212*a* and 1220*a* (eye of the needle (EON) pressfit). For the printed circuit board 1206*a*: the tolerance between the mounting members 1214*a* and 1226*a* (EON pressfit hole) and the mounting member 1210*a* (location post hole). The tolerance of the clearance fit of the mounting member 1210*a* (location post hole) to the mounting member 1208*a* (housing location post). For the receptacle connector: the tolerance between the mounting member 1208*a* (location post) and the contact mating portions 1234*a* and 1234*b*.

FIG. 12B represents a QSFP connector assembly where the retention members described previously are present. FIG. 12B shows an electronic assembly 1200*b* comprising a cage 1202*b*, a receptacle connector 1204*b* coupled to cables 1212*b*, and a printed circuit board 1206*b*.

Cage 1202*b* is mounted to printed circuit board 1206*a* by at least one mounting member 1220*b* of the cage 1202*b*, which may comprise a pressfit, engaged with at least one mounting member 1226*b* of the printed circuit board 1206*b*, which may comprise a hole.

Cage 1202*b* includes a module stop 1210*b* configured to position a plug inserted into the cage 1202*b*, such as by engaging a surface of the plug with a surface of the module stop 1210*b*. In this manner, the position of a transceiver is established relative to the cage module stop 1210*b*.

In the illustrative embodiment of FIG. 12B, the plug 1204*b* includes a slot 1232*b* lined with lower contact mating portions 1234*b* and upper contact mating portions 1236*b*. The module stop 1210*b* is configured to position the receptacle connector 1204*b* by the forward stop 1208*b* of the receptacle connector 1204*b*. The receptacle connector 1204*b* is retained against the module stop 1210*a* by the retention member 1214*b*. In this manner the position of the receptacle connector is established relative to the module stop 1210*b*.

Accordingly, the stackup of tolerances involved in the eventual mating of the transceiver with the receptacle connector 1204*b* are as follows. For the cage 1204*b*: the tolerance of the module stop 1210*b* material (which may be formed from similar materials and by similar techniques as third retention member 910) thickness. For the receptacle connector: the tolerance between the forward stop 1208*b* (fourth retention member) and the contact mating point. Due to the reduced number of stacking tolerances, the relevant tolerance stackup may be decreased by ±0.155. Accordingly, nominal wipe of the transceiver can be reduced by 0.155 mm, and maximum wipe of the transceiver can be reduced by 0.31 mm.

Figure 13B:
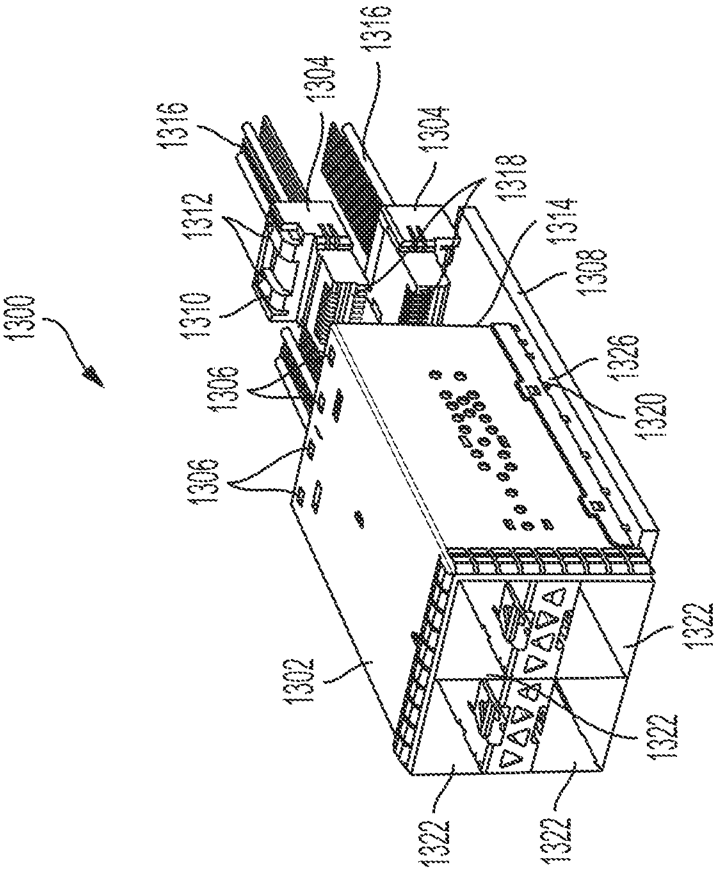
FIGS. 13A and 13B are perspective views of a receptacle terminating cables and a partially exploded view of an electronic assembly in which an array of receptacle connectors are mounted to a printed circuit board and enclosed by a cage.
Figure 13A:
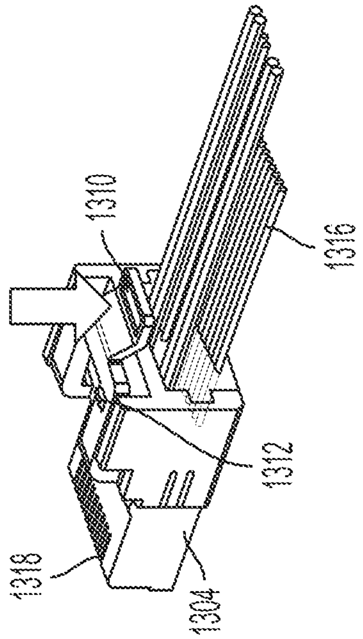

FIGS. 13A and 13B illustrate that retention techniques as described above in connection with FIGS. 7A . . . 7C may be used with stacked and ganged cage configurations. FIG. 13B, for example, shows an electrical assembly 1300 employing a 2×2 ganged configuration. FIG. 13A illustrates a receptacle connector 1304 having a slot 1318 lined with mating contact portions and having cables 1316 attached of the type that might be rear-loaded in a channel of ganged cage. Each channel may receive such a receptacle connector 1304.

FIG. 13B shows an electronic assembly 1300 in which an array of receptacle connectors 1304 are enclosed by a cage 1302 mounted to a printed circuit board 1308 by a mounting member 1320 of the cage 1302, such as a pressfit, and a mounting member 1326 of the printed circuit board 1308, such as a hole. The cage 1302 and receptacle connector 1304 shown in FIGS. 13A and 13B may be formed by similar techniques as described above with reference to cage 702 and receptacle connector 704. The cage of FIG. 12B differs from cage 702 in that it includes an N×N array of channels having front ends 1322 configured to receive at least two transceiver and rear ends 1314 in which receptacle connectors 1304 are inserted. In FIG. 13B, the array is a 2×2 array, although other configurations are possible. Such a configuration may allow a higher density of signals than assembly 700 while still maintaining the retention and disengagement advantages describe with references to assemble 700.

FIG. 13B illustrates that receptacle 1304 connectors inserted into channels on the top and bottom of the ganged cage 1302 are inserted with opposite orientations. The latching projections 1312 face upwards on the receptacle connectors 1304 inserted into the top row, and face downwards on the receptacle connectors 1304 inserted into the bottom row. The locations of the retention members and polarizing features may be reversed. For example, openings such as 1306, which receive the latching projections 1312 of the receptacle connectors 1304, may be in a top wall for channels in the top row, and on the bottom wall for channels in the bottom row.

While FIGS. 13A and 13B show an arrangement of retention and disengagement members 1310 similar to those in assembly 700, other retention and disengagement member configurations may be used in an N×N array. For example, the retention and disengagement member configurations of assembly 600, assembly, 800 or assembly 900 may alternatively or additionally be employed. Additionally, each of the retention and actuator configurations need not be the same for each receptacle connector of the N×N array cage. That is to say two or more different retention and actuator configurations may be employed by a single N×N array cage.

Figure 14:
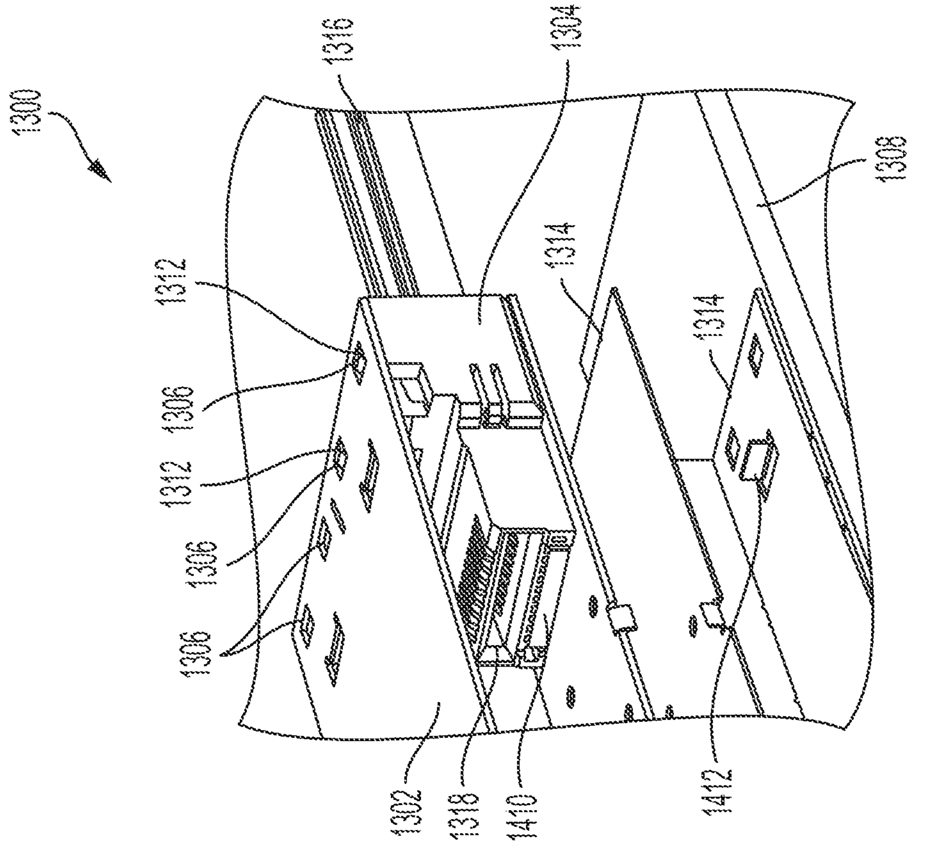
FIG. 14 is a side perspective view an electronic assembly in which an array of receptacle connectors are mounted to a printed circuit board and enclosed by a cage, with a side wall of the cage cut away.

FIG. 14 show an additional view of an electronic assembly 1300 in which an array of receptacle connectors 1304 is enclosed by a cage 1302 mounted to a printed circuit board 1308. FIG. 14 shows a cutaway view displaying some internal retention members used to position the receptacle connectors 1304 with the N×N array cage 1302. In some embodiments, receptacle connectors 1304 of a lower row of a 2×2 array cage 1302 may be arranged upside down relative to receptacle connectors 1304 of an upper row the 2×2 array cage 1302. This may allow internal retention members to be formed of a same internal wall for multiple stacked receptacle connectors 1304. In this example, a tab, such as 1410 may be included adjacent the mating face of the receptacle connector 1304 as a second retention member that positions the connector. A separate tab, such as tab 1412 may be included in each channel, to block insertion of the receptacle connector 1304 with an orientation other than the orientation for which that channel is configured.

Figure 15:
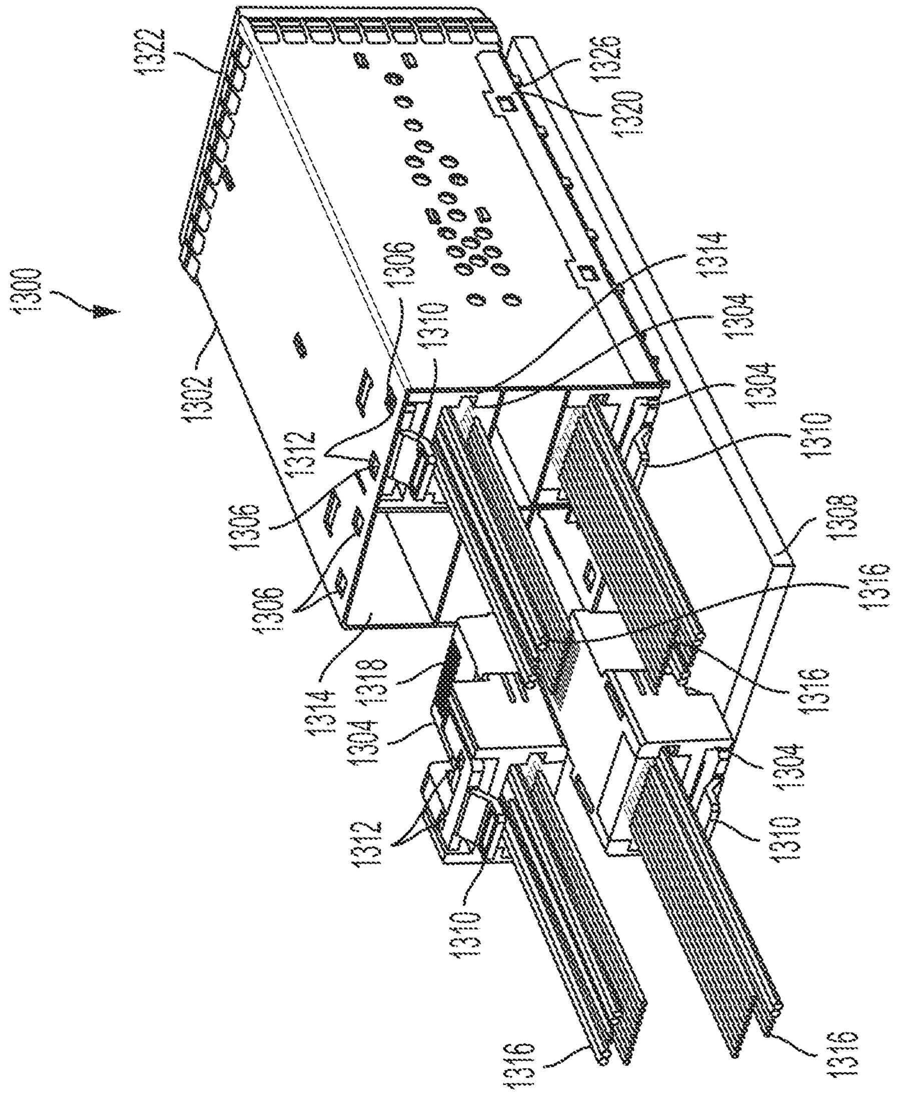
FIG. 15 is a rear perspective view of an electronic assembly in which an array of receptacle connectors are mounted to a printed circuit board and enclosed by a cage.

FIG. 15 shows an additional view of an electronic assembly 1300 in which an array of receptacle connectors 1304 are mounted to a printed circuit board 1308 and enclosed by a cage 1302. While a rear cover is not shown in FIG. 15, a rear cover may be employed and affixed over the receptacle connectors 1304 to reduce a level of electromagnetic interferences (EMI) that escapes the rear of the cage.

Figure 16:
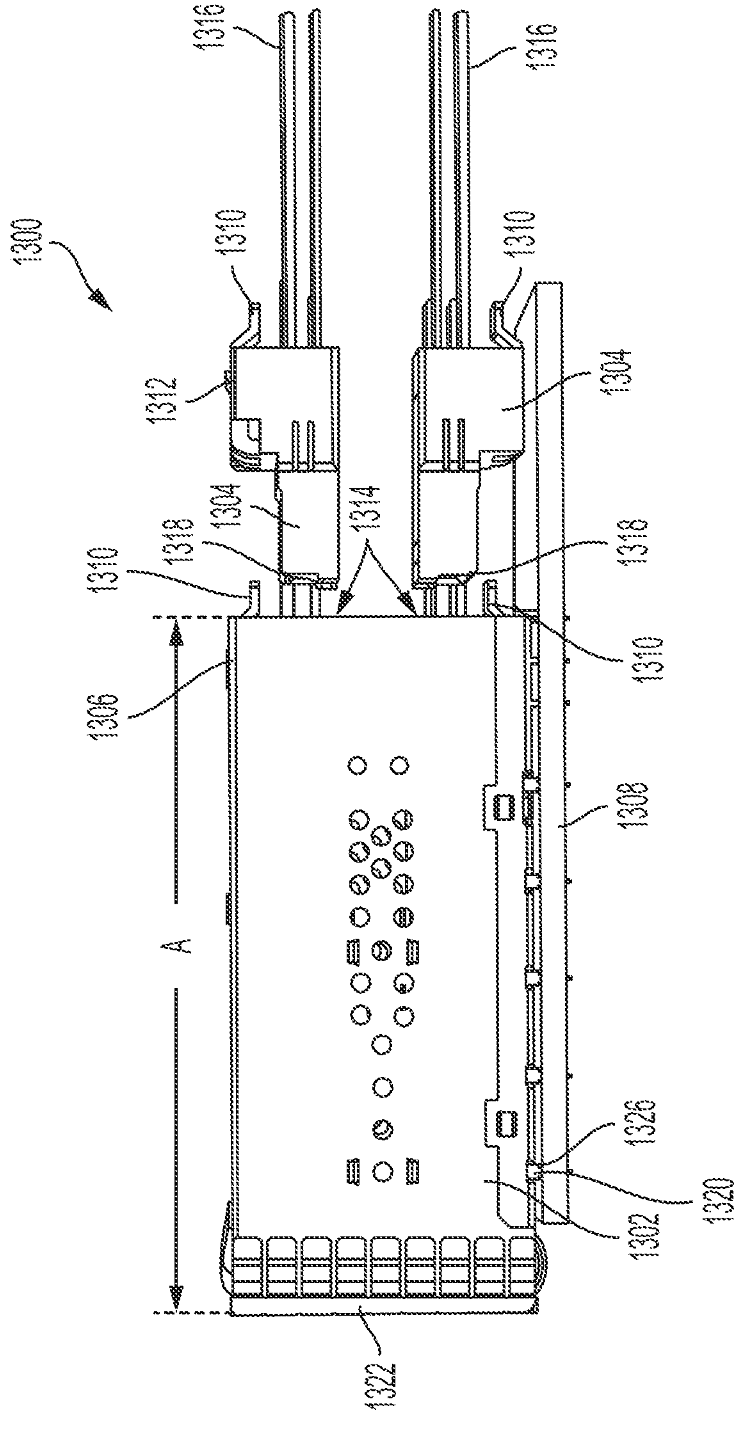
FIG. 16 is a side view of an electronic assembly in which an array of receptacle connectors are mounted to a printed circuit board and enclosed by a cage.

FIG. 16 shows an additional view of an electronic assembly 1300 in which an array of receptacle connectors 1304 are mounted to a printed circuit board 1308 and enclosed by a cage 1302. In some embodiments, a component keepout may be required to remove the receptacle connectors from the cage. In configurations where space on the printed circuit board directly behind the cage is required for other components, other cage and receptacle connector configurations may be employed, such as configurations shown in FIGS. 4A . . . 5C. As illustrated in FIG. 16, the cage 1302 may have a length A along an insertion direction of transceivers into the cage 1302. In some embodiments, length A may be about 57.5 millimeters. Such a length may provide additional space for additional components behind cage 1302.

Having thus described several embodiments, it is to be appreciated that various alterations, modifications, and improvements may readily occur to those skilled in the art. Such alterations, modifications, and improvements are intended to be within the spirit and scope of the invention.

For example, FIG. 1 illustrates an electronic device in which a midboard cable termination assembly might be used. It should be appreciated that FIG. 1 shows a portion of such a device. For example, board 110 may be larger than illustrated and may contain more components than illustrated. Likewise, board 118 may be larger than illustrated and may contain components. Moreover, multiple boards parallel to board 118 and/or parallel to board 110 may be included in the device.

A midboard cable termination assembly might also be used with board configurations other than the illustrated orthogonal configuration. The midboard cable termination assembly might be used on a printed circuit board connected to another, parallel printed circuit board or might be used in a daughtercard that plugs into a backplane at a right angle. As yet another example, the midboard cable termination assembly might be mounted on a backplane.

As yet another example of a possible variation, a midboard cable termination assembly mounted on board 110 is shown with a cable that connects to a connector that is similarly mounted to board 110. That configuration is not, however, a requirement, as the cable may be connected directly to the board, an integrated circuit or other component, even directly to the board 110 to which the midboard cable termination assembly is mounted. As another variation, the cable may be terminated to a different printed circuit board or other substrate. For example, a cable extending from a midboard cable termination assembly mounted to board 110 may be terminated, through a connector or otherwise, to a printed circuit board parallel to board 110.

As another example, positioning of the plug and receptacle was described based on the same feature of the cage. In some embodiments, each of the plug and receptacle may be positioned with respect to a feature of the cage. A small tolerance my nonetheless be provided, by accurately positioning those features with respect to each other, which may be possible by stamping the features from the same sheet of metal, for example. For example, tabs and retention members of cages may be stamped from metal sheets to reduce variability.

As a further example, stacked or ganged configurations are illustrated in which receptacle connectors, terminating cables and without board mounting contact tails are rear-loaded into each of multiple channels in a cage. Receptacle connectors of different configurations may be inserted into different ones of the channels in a stacked or ganged cage. Some receptacle connectors, such as those inserted in lower channels may have board mounting contact tails, for example.

As an example of another variation, FIG. 12 illustrates a configuration in which a surface mount connector is positioned by a post inserted into a printed circuit board. In other embodiments, a connector, including a connector with surface mount contact tails, might be positioned by a second retention member as described above.

Further, one or more designs are described with retention features that hold the receptacle connector within a channel of a cage. In some embodiments, one or more of the retention features may be spring fingers or otherwise configured to bias the connector into another retention member. For example, the first retention members may be configured to bias the connector against the second retention member, providing greater positional accuracy of the connector with respect to the cage and/or a plug that is also positioned by a retention member of the cage.

Terms signifying direction, such as "upwards" and "downwards," were used in connection with some embodiments. These terms were used to signify direction based on the orientation of components illustrated or connection to another component, such as a surface of a printed circuit board to which a termination assembly is mounted. It should be understood that electronic components may be used in any suitable orientation. Accordingly, terms of direction should be understood to be relative, rather than fixed to a coordinate system perceived as unchanging, such as the earth's surface.

Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Examples of arrangements that may be implemented according to some embodiments include the following:

1. A method of mounting a receptacle connector, configured for making cabled connections to a remote portion of a printed circuit board, to a cage configured to enclose the receptacle connector, the method comprising:
   - inserting the receptacle connector into a channel in the cage;
   - engaging the receptacle connector with a first retention member of the cage; and
   - engaging the receptacle connector with a second retention member of the cage such that the receptacle connector is arranged between the first retention member and the second retention member.
2. The method of example 1, wherein:
   - engaging the receptacle connector with the second retention member of the cage comprises pressing the receptacle connector against a tab on the cage partially blocking the channel.
3. The method of example 2, wherein:
   - engaging the receptacle connector with the first retention member comprises latching the receptacle connector to the cage.
4. The method of example 3, wherein:
   - latching the receptacle connector to the cage comprises:
   - deflecting a latching arm on the receptacle connector such that a latching projection on the latching arm clears the cage;
   - moving the receptacle into the channel until the latching projection aligns with an opening of the cage; and
   - inserting the latching projection into the opening of the cage.
5. The method of example 3, wherein:
   - latching the receptacle connector to the cage comprises:
   - deflecting a latching portion on the cage such that a latching projection on the receptacle arm clears the cage;
   - moving the receptacle into the channel until the latching projection aligns with an opening of the cage; and
   - moving the latching portion to an un-deflected position such that the latching projection enters the opening of the cage.
6. The method of example 1, further comprising, after the inserting the receptacle connector into the channel in the cage and the engaging the receptacle connector with the first retention member and the second retention member, mounting the cage to the printed circuit board.
7. The method of example 6, wherein:
   - mounting the cage to the printed circuit board comprises inserting pressfits on the cage into vias in the printed circuit board.
8. The method of example 7, wherein:
   - the receptacle connector comprises a plurality of conductive elements comprising mating contact portions and contact tails; and
   - the method further comprises surface mount soldering the contact tails to the printed circuit board.

9. The method of example 1, further comprising, before the inserting the receptacle connector into the channel in the cage and the engaging the receptacle connector with the first retention member and the second retention member, mounting the cage to the printed circuit board.

10. The method of example 1, wherein inserting the receptacle connector into the channel in the cage comprises inserting the receptacle connector into a top opening in the cage, the top opening being opposite a portion of the cage configured to be mounted to the printed circuit board.

11. The method of example 1, wherein inserting the receptacle connector into the channel in the cage comprises inserting the receptacle connector into the channel from a rear of the cage, the rear opening being opposite a front portion of the cage configured to guide a transceiver to mate with the receptacle connector.

12. The method of example 1, wherein the inserting the receptacle connector into the channel in the cage and the engaging the receptacle connector with the first retention member and the second retention member is performed without engaging the receptacle connector with the printed circuit board.

13. The method of example 1, wherein:

the cage has a bottom wall comprising a first surface configured for mounting against the printed circuit board and a second surface, opposing surface;

the cage comprises pressfits extending perpendicularly from the first surface of the bottom wall; and inserting the receptacle connector into the channel in the cage comprises sliding the receptacle over the second surface of the bottom wall.

14. A connector assembly configured to be mounted to a printed circuit board and configured for making cabled connections to a remote portion of the printed circuit board, the system comprising:

a conductive cage configured to be mounted to the printed circuit board, wherein the conductive cage comprises at least one channel configured to receive a transceiver;

a receptacle connector comprising a plurality of conductive elements configured to mate with conductive elements of the transceiver; and a cable comprising a plurality of conductors terminated to conductive elements of the receptacle connector and configured to be coupled to the remote portion of the printed circuit board, wherein the receptacle connector is:

disposed within the channel of the cage with at least a portion of the cable disposed outside of the cage, engaged with a first retention member of the cage, and engaged with a second retention member of the cage such that the receptacle connector is positioned within the channel between the first retention member and the second retention member.

15. The connector assembly of example 14, wherein:

the first retention member comprises a tab extending into the channel.

16. The connector assembly of example 15, wherein:

the tab is cut from a wall of the cage.

17. The connector assembly of example 15, wherein:

the channel is bounded by a top wall, a bottom wall, a first side wall and a second side wall, and the tab is cut from the top wall of the channel.

18. The connector assembly of example 15, wherein:

the channel is bounded by a top wall, a bottom wall, a first side wall and a second side wall, and the tab is cut from the bottom wall of the channel.

19. The connector assembly of example 15, wherein:

the second retention member comprises a latch comprising interlocking latching members on the cage and receptacle connector.

20. The connector assembly of example 19, wherein:

the interlocking latching members comprise an opening in a wall of the cage and a projection on the receptacle connector.

21. The connector assembly of example 20, wherein:

at least one of the interlocking latching members comprises a spring arm.

22. The connector assembly of example 21, wherein:

the receptacle comprises the spring arm.

23. The connector assembly of example 21, wherein:

the cage comprises the spring arm.

24. The connector assembly of example 14, wherein:

the second retention member biases the receptacle towards the first retention member.

25. The connector assembly of example 24, wherein:

the second retention member comprises a rear wall of the cage.

26. The connector assembly of example 24, wherein:

the second retention member comprises fingers extending from a wall of a cage.

27. The connector assembly of example 14, wherein:

the connector assembly is mounted to the printed circuit board at a first location, and a first end of the cable is terminated to the receptacle connector and a second end of the cable is coupled to a portion of the printed circuit board at a second location that is at least 6 inches from the first location.

28. The connector assembly of example 27, wherein:

a semiconductor chip configured to transmit and/or receive signals of 56 Gbps or faster is mounted at the second location.

29. The connector assembly of example 14, wherein:

the receptacle connector is configured to receive a transceiver complying with a QSFP specification.

30. A method of operating a connector assembly mounted to a printed board and comprising a cage and a receptacle connector, wherein the cage comprises a channel and a tab extending into the channel with the position of the receptacle connector based in part on the position of the tab, the method comprising:

inserting a plug into the channel;

mating the plug and the receptacle; and establishing the insertion depth of the plug into the receptacle based on interference between the tab and the plug such that a relative position of the plug and receptacle is based at least in part on the tab.

31. The method of operating a connector assembly of example 30, further comprising passing PAM-4 signals in excess of 50 Gbps through the mated plug and receptacle.

32. The method of operating a connector assembly of example 30, further comprising:

wiping mating contact portions of the receptacle along pads of the plug for a wipe length limited by the established insertion depth to less than 40% of the length of the pads.

33. The method of operating a connector assembly of example 32, wherein:

the wipe length is between 20% and 40% of the length of the pads.

34. The method of operating a connector assembly of example 30, wherein:

the plug has pads positioned in accordance with a QSFP standard that specifies a nominal wipe length, and the method further comprises wiping mating contact portions of the receptacle along pads of the plug for a wipe length limited by the established insertion depth to at least 0.2 mm less than the nominal wipe length.

35. The method of operating a connector assembly of example 30, wherein:

the receptacle is pressed against a first side of the tab, and establishing the insertion depth of the plug into the receptacle based on interference between the tab and the plug comprises pressing a portion of the plug against a second side of the tab, opposite the first side.

36. The method of operating a connector assembly of example 30, further comprising passing signals through the mated plug and receptacle at a frequency of at least 10 GHz.

37. The method of operating a connector assembly of example 30, wherein establishing the insertion depth of the plug into the receptacle based on interference between the tab and the plug comprises:

preventing insertion of the plug beyond a predetermined relative position of the plug and receptacle by physically blocking further insertion of the plug, using the tab.

38. The method of operating a connector assembly of example 30, wherein establishing the insertion depth of the plug into the receptacle based on interference between the tab and the plug comprises:

engaging a receptacle surface of the receptacle with a first tab surface of the tab, and engaging a plug surface of the plug with a second tab surface of the tab, the second tab surface being opposite the first tab surface.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Also, circuits and modules depicted and described may be reordered in any order, and signals may be provided to enable reordering accordingly.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. A conductive cage configured to be mounted to a printed circuit board and configured to receive a transceiver, the conductive cage comprising:

a channel comprising a first end and a second end opposite the first end, wherein the cage is configured to enclose a receptacle connector with a mating interface of the receptacle connector aligned with the channel;

at least one feature integrally formed with the conductive cage extending into the channel, wherein the at least one feature is positioned to:

interfere with a plug inserted into the channel from the first end to establish an insertion depth of the plug; and engage the receptacle connector in a position in which the mating interface has a predetermined position with respect to the plug when the plug is inserted into the channel to the established insertion depth, in combination with the receptacle connector, wherein the receptacle connector is configured to pass signals in excess of 50 Gbps.

2. The conductive cage of claim 1, wherein:

the at least one feature comprises a tab extending into the channel.

3. The conductive cage of claim 2, wherein:

the tab is cut from a wall of the cage.

4. The conductive cage of claim 1, wherein:

the cage further comprises a latching feature configured to interlock with a complementary latching feature on the receptacle connector.

5. The conductive cage of claim 4, wherein:

the latching feature of the cage comprises an opening in a wall of the cage configured to interlock with a projection on the receptacle connector.

6. A conductive cage configured to be mounted to a printed circuit board and configured to receive a transceiver, the conductive cage comprising:

a channel comprising a first end and a second end opposite the first end, wherein the cage is configured to enclose a receptacle connector with a mating interface of the receptacle connector aligned with the channel;

at least one feature integrally formed with the conductive cage extending into the channel, wherein the at least one feature is positioned to:

interfere with a plug inserted into the channel from the first end to establish an insertion depth of the plug; and engage the receptacle connector in a position in which the mating interface has a predetermined position with respect to the plug when the plug is inserted into the channel to the established insertion depth, further comprising:

a retention member configured to bias the receptacle connector towards a feature of the at least one feature.

7. A connector assembly comprising:

a conductive cage comprising a channel and configured to be mounted to a printed circuit board and to receive a plug connector in the channel; and a receptacle connector comprising a mating interface aligned with the channel, wherein:

the conductive cage comprises at least one projection; and the at least one projection engages the receptacle connector and is configured to engage with the plug connector when the plug connector is inserted into the channel so as to establish an insertion depth of the plug into the mating interface of the receptacle.

8. The connector assembly of claim 7, wherein the cage is metal.

9. A connector assembly comprising:

a conductive cage comprising a channel and configured to be mounted to a printed circuit board and to receive a plug connector in the channel; and a receptacle connector comprising a mating interface aligned with the channel, wherein:

the conductive cage comprises at least one feature; and the at least one feature engages the receptacle connector and is configured to engage with the plug connector when the plug connector is inserted into the channel so as to establish an insertion depth of the plug into the mating interface of the receptacle, in combination with a plug, wherein the plug comprises pads that provide a maximum wipe of 1.34 mm when the plug is inserted to the established insertion depth.

10. The connector assembly of claim 9, further comprising:

a plurality of cables coupled to the mating interface of the receptacle connector and terminated to the printed circuit board at a location remote from the cage.

11. The connector assembly of claim 9, wherein the plug connector comprises a transceiver.

12. The connector assembly of claim 9, wherein the plug connector comprises a transceiver that operates at a data rate of at least 50 Gbps.

13. A conductive cage configured to be mounted to a printed circuit board and configured to receive a transceiver and a receptacle connector, the conductive cage comprising:

a channel comprising a first end a second end opposite the first end, a first retention member extending into the cage between the first end and the second end, the first retention member comprising:

a front side configured to engage with a surface of the transceiver, and a back side configured to engage with a surface of the receptacle connector such that a relative position of the transceiver and the receptacle connector is based at least in part on the first retention member, and a second retention member configured to bias the receptacle connector toward the first end of the channel such that the receptacle connector is engaged with the first retention member of the cage.

14. The conductive cage of claim 13, wherein:

the first retention member comprises a tab extending into the channel.

15. The conductive cage of claim 14, wherein:

the tab is cut from a wall of the cage.

16. The conductive cage of claim 13, wherein the receptacle connector is configured to pass signals in excess of 50 Gbps.

17. The conductive cage of claim 13, wherein:

the cage comprises an opening and a receptacle comprises a projection configured to interlock with the opening.

18. The conductive cage of claim 17, wherein:

the projection comprises a spring arm.

* * * * *